United States Patent [19]

Kobayashi et al.

[11] Patent Number: 5,128,062

[45] Date of Patent: Jul. 7, 1992

[54] OPTICALLY ACTIVE COMPOUNDS AND LIQUID CRYSTAL COMPOSITIONS CONTAINING SUCH COMPOUNDS

[75] Inventors: Shogo Kobayashi, Tokyo; Shigeki Ishibashi, Houya; Fumiyoshi Urano, Niiza; Takaaki Negishi, Kawagoe, all of Japan

[73] Assignees: Wako Pure Chemical Industries, Ltd., Osaka; Nippon Telegraph & Telephone Corporation, Tokyo, both of Japan

[21] Appl. No.: 534,610

[22] Filed: Jun. 6, 1990

[30] Foreign Application Priority Data

Jun. 7, 1989 [JP] Japan ................................. 1-144393

[51] Int. Cl.$^5$ ................. C09K 19/12; C09K 19/30; C09K 19/20; C07C 69/76
[52] U.S. Cl. ................. 252/299.66; 252/299.63; 252/299.64; 252/299.65; 252/299.67; 560/62; 560/65; 560/102
[58] Field of Search ................. 560/62, 65, 102; 252/299.63, 299.65, 299.66, 299.67, 299.64

[56] References Cited

U.S. PATENT DOCUMENTS

| | | | |
|---|---|---|---|
| 4,614,609 | 9/1986 | Inoue et al. | 252/299 |
| 4,622,165 | 11/1986 | Kano et al. | 252/299.65 |
| 4,732,699 | 3/1988 | Higuchi et al. | 252/299.66 |
| 4,886,619 | 12/1989 | Janulis | 252/299.1 |
| 4,892,675 | 1/1990 | Nohira et al. | 252/299.01 |
| 4,911,861 | 3/1990 | Higuchi et al. | 252/299.65 |
| 4,943,386 | 7/1990 | Takehara et al. | 252/299.65 |
| 5,059,345 | 10/1991 | Kobayashi et al. | 252/299.61 |

FOREIGN PATENT DOCUMENTS

| | | | |
|---|---|---|---|
| 0174816 | 3/1986 | European Pat. Off. | |
| 0251058 | 1/1988 | European Pat. Off. | 560/62 |
| 0309774 | 4/1989 | European Pat. Off. | 252/299.01 |
| 0312210 | 4/1989 | European Pat. Off. | 252/299.01 |
| 0329153 | 8/1989 | European Pat. Off. | 252/299.01 |
| 0315193 | 5/1989 | Fed. Rep. of Germany . | |
| 57-11944 | 1/1982 | Japan | 560/102 |

64-47737 2/1989 Japan .
2199826A 7/1988 United Kingdom .

OTHER PUBLICATIONS

Goodby, J. W. et al., Helical Twist & Spontaneous Polarization Direction in Smectic Liquid Crystals, J. Am. Chem. Soc. 1986, 108, pp. 4736–4742.
Clark et al., Submicrosecond bistable electro-optic switching in liquid crystals, App. Phys. Lett. 36(11), pp. 899–901 (1980).

*Primary Examiner*—Robert L. Stoll
*Assistant Examiner*—C. Harris
*Attorney, Agent, or Firm*—Armstrong, Nikaido, Marmelstein, Kubovcik & Murray

[57] ABSTRACT

An optically active compound of the formula:

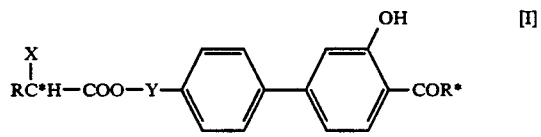

wherein R is alkyl or alkoxy, R* is an optically active alkyl group, X is alkyl or halogen, Y is a single bond

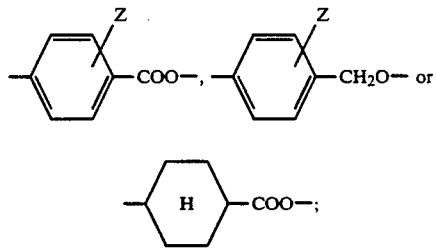

and C* is an asymmetric carbon, is chemically stable and shows or induces large spontaneous polarization and is useful in a chiral liquid crystal composition.

6 Claims, No Drawings

OPTICALLY ACTIVE COMPOUNDS AND LIQUID CRYSTAL COMPOSITIONS CONTAINING SUCH COMPOUNDS

BACKGROUND OF THE INVENTION

This invention relates to novel optically active compounds and chiral liquid crystal compositions incorporating such novel optically active compounds.

Liquid crystal displays have advantages in that they are actuated by a low electric voltage, that they consume only a little electric power, that they are fabricated into thin layer forms, and that they are relatively light in weight. Making use of these advantages, liquid crystal display devices are applied for use in desk electric calculators, watches and televisions. Nematic liquid crystals have hitherto been widely used as the materials for such display elements. However, nematic liquid crystals are detrimental in that the response speeds thereof are low, i.e. in the order of several tens milliseconds. In order to avoid the disadvantage of the nematic liquid crystals, it has been proposed to use ferroelectric liquid crystals in the display system, for example, by N. A. Clark et al., "Submicrosecond Bistable Electro-Optic Switching in Liquid Crystals", Appl. Phys. Lett., 36, 899 (1980). In the display system proposed by this prior art reference, the chiral smectic C liquid-crystalline phase (hereinafter referred to as "Sc' phase") of a ferroelectric liquid crystal is utilized. However, the known ferroelectric liquid crystal compounds are detrimental in that they exhibit the Sc' phase in only a narrow temperature range and that the spontaneous polarization thereof is low.

In order to apply ferroelectric liquid crystals in a practical electro-optic switching element, it has been tried to use a mixture containing a compound having high spontaneous polarization or inducing high spontaneous polarization, a compound having a low viscosity, compounds having reverse helical twists, and compounds which exhibit the Sc or Sc' phase in a wide temperature range. But no satisfactory results were obtained.

SUMMARY OF THE INVENTION

The present invention has for its object to provide novel optically active compounds which are chemically stable and show in themselves large spontaneous polarization or have the nature of inducing large spontaneous polarization when added to an Sc liquid crystal composition, and novel ferroelectric liquid crystal materials incorporated with said optically active compounds and showing Sc* phase in a wide temperature range and high response speed.

In accordance with the present invention, there is provided an optically active compound represented by the formula:

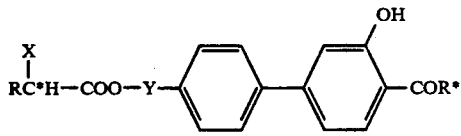

[I]

wherein R represents a straight-chain or branched alkyl group having 1 to 16 carbon atoms (but R and X can not be the same alkyl group) or a straight-chain or branched alkoxy group having 1 to 16 carbon atoms; R* represents an optically active alkyl group having 1 to 16 carbon atoms; X represents a lower alkyl group or a halogen atom; Y represents a single bond,

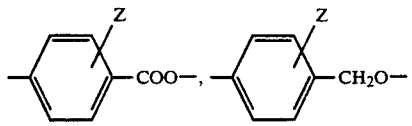

(where Z is a hydrogen atom, a halogen atom or a cyano group) or

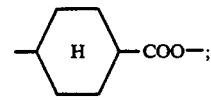

and C* represents an asymmetric carbon atom.

The present invention also provide a liquid crystal composition comprising said optically active compound(s).

DESCRIPTION OF THE PREFERRED EMBODIMENTS

In order to apply ferroelectric liquid crystals in a practical electro-optic switching element, it is required to control the Sc' temperature range and the electro-optic characteristics thereof, such as spontaneous polarization, viscosity, helical twist and tilt angle, within proper ranges. Further, the following materials are required to be put in practical use:

(1) Materials having or inducing high spontaneous polarization.

(2) Compound which can unloose or release the helical twist by the addition thereof in a small quantity; and (3) Liquid crystal compounds exhibiting the smectic C phase in a wide temperature range. A number of liquid crystal materials having various properties and being capable of constituting the liquid crystal compositions.

A salient feature of the present invention resides in the provision of a ferroelectric liquid crystal exhibiting high spontaneous polarization by binding the molecular structure of

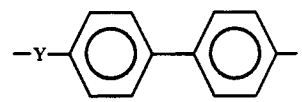

(hereinafter referred to as "core") directly with a carbonyl group and introducing of a hydroxy group at the ortho-position to the carbonyl group. The spontaneous polarization of a ferroelectric liquid crystal is induced by the dipole perpendicular to the molecular axis of the liquid crystal. Almost all of the known ferroelectric liquid crystals utilize the dipoles of esters or ethers. When ether or ester groups are changed to carbonyl groups in the dipoles held between core and asymmetric carbons, spontaneous polarization enlarges almost proportionally to the moment possessed by said groups. When a hydroxyl group is further introduced to the ortho position of the carbonyl group, the directions of dipoles of carbonyl group and hydroxyl group coincide with each other owing to formation of intramolecular hydrogen linkage, which gives an additional momentum to spontaneous polarization. A methylene chain may intervene between the carbonyl group and asymmetric carbon, but direct linkage of carbonyl group and asymmetric carbon has a prominent effect for expanding spontaneous polarization. Examples of R* groups having asymmetric carbon at 1-position include 1-methylpropyl group, 1-methylbutl group, 1-methylpentyl group, 1-methylhexyl group, 1-methylheptyl group, 1-methyloctyl group, 1-methylnonyl group, 1-methyldecyl group, 1-methylundecyl group, 1-methyldodecyl group, 1,3-dimethylbutyl group, 1,6-dimethylheptyl group, etc. For enhancing liquid crystal quality, it is desirable to introduce a methylene group between carbonyl group and asymmetric carbon. Examples of R* including such a methylene chain are 2-methylbutyl group, 2-methylpenthyl group, 2-methylhexyl group, 3-methylpentyl group, 4-methylhexyl group, etc.

Another feature of the present invention resides in the introduction of said carbonyl-containing optically active group (optical active alkanoyl group) and other optically active group in one molecule with the intervention of core portion. When the directions of spontaneous polarization caused by said two optically active groups are identical, there can be obtained a compound which shows a larger spontaneous polarization than the compounds having said either of said optically active groups singly or induces large spontaneous polarization in the composition. In case the directions of the helices brought about by the two optically active groups are opposite to each other, it is considered that both helices counteract each other to prolong the helical pitch of the whole molecule.

For making identical the directions of spontaneous polarization set up by the two optically active groups, it needs to select one of the following configurational combinations.

(1) In case the absolute configuration of alkanoyl group with R* group having a branch at an odd-numbered position is (S), the absolute configuration of

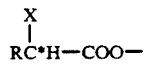

is also (S) when R is an alkyl group, and R) when R is an alkoxy group and X is a methyl group.

(2) In case the absolute configuration of alkanoyl group with R* group having a branch at an odd-numbered position is (R), the absolute configuration of

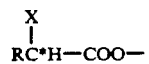

is (R) when R is an alkyl group, and (S) when R is an alkoxy group and X is a methyl group.

(3) In case the absolute configuration of alkanoyl group with R* group having a branch at an even-numbered position is (S), the absolute configuration of

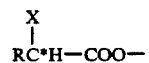

is (R) when R is an alkyl group, and (S) when R is an alkoxy group and X is a methyl group.

(4) In case the absolute configuration of alkanoyl group with R* group having a branch at an even-numbered position is (R), the absolute configuration of

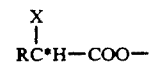

is (S) when R is an alkyl group, and (R) when R is an alkoxy group and X is a methyl group.

Among the compounds having a configurational combination in which the directions of spontaneous polarization caused by the two optically active groups is identical, those with R* group having a branch at the 1-position can develop an especially large spontaneous polarization.

For obtaining a compound with a long helical pitch, it is necessary to make a configurational arrangement so that the directions of the helices created by the two optically active groups will be opposite to each other. A typical example of such a compound is the one in which an alkanoyl group of (S) configuration, having R* group branched at the 1-position, is combined with an optically active group of (R) configuration, with R and X in the formula

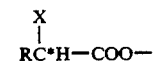

being an alkoxy group and a methyl group, respectively. This compound is very useful one as it also evokes large spontaneous polarization due to coincidence of the directions of spontaneous polarization.

In the formula (I), R may represent, for example, alkyl groups (which may be either straight-chain or branched) having 1 to 16 carbon atoms such as methyl, ethyl, propyl, butyl, pentyl, hexyl, heptyl, octyl, hexadecyl, etc., or alkoxy groups (either straight-chain or branched) having 1 to 16 carbon atoms such as methoxy, ethoxy, propoxy, butoxy, pentyloxy, hexyloxy, heptyloxy, octyloxy, hexadecyloxy, etc. For obtaining maximum spontaneous polarization, R is preferably a branched alkyl or alkoxy group. X in the formula (I) represents, for example, lower alkyl groups (which may be either straight-chain or branched having preferably 1 to 6 carbon atoms) such as methyl, ethyl, propyl, butyl, etc. or halogen atoms such as fluorine atom, bromine atom, chlorine atom, etc. The halogen atoms represented by Z in the formulas

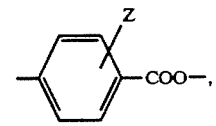

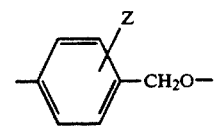

in the definition of Y in the formula (I) include fluorine atom, bromine atom, chlorine atom, etc.

Introduction of a halogen atom such as fluorine, bromine or chlorine atom or a cyano group to the core is a generally employed means for enhancing liquid crystal quality or promoting spontaneous polarization. This method is effective in this invention, too. It is thus noted that introduction of a halogen atom or a cyano group to the molecular core is conductive to the enhancement of liquid crystal quality and development of spontaneous polarization.

In the present invention, the core portion held between the two optically active groups may be either 2-ringed or 3-ringed. However, as seen from the examples given later, the compounds having 3-ring core include those showing large spontaneous polarization unknown in the past, and also these compounds induce larger spontaneous polarization than the corresponding compounds having 2-ring core in the smectic liquid crystal compositions to provide a composition with high response speed. Usually, if the compounds are the same in structure of chiral portion, those with 2-ring core can give a composition with higher response speed because of lower viscosity. Contrary to this, in the above case the compounds with 3-ring core can provide a composition with higher response speed. This may be accounted for by the fact that there is realized expansion of spontaneous polarization surpassing the increase of viscosity by incorporating 3-ring core instead of 2-ring one. It is not clear why spontaneous polarization is expanded by replacing 2-ring core with 3-ring core, but it is considered that when the core is of a 3-ring structure, a certain interaction between carbonyl and ester groups contributes to molecular alignment.

Listed below are the examples of the compounds provided in accordance with the present invention. It is to be understood that the compounds obtainable according to this invention are not limited to these examples.

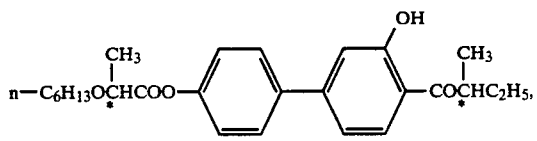

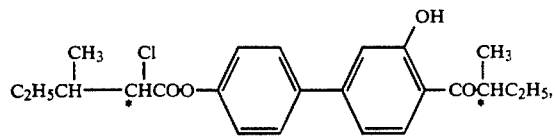
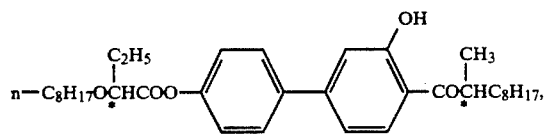
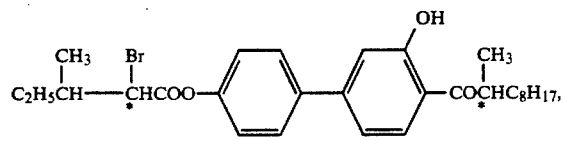
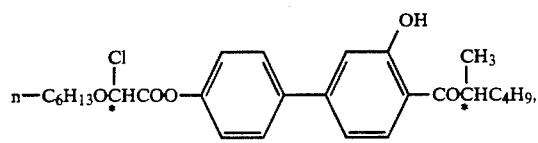
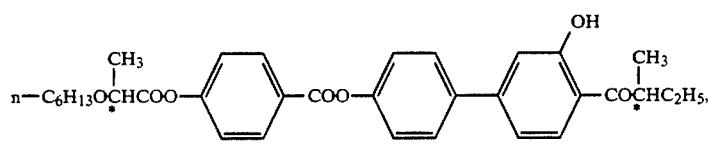
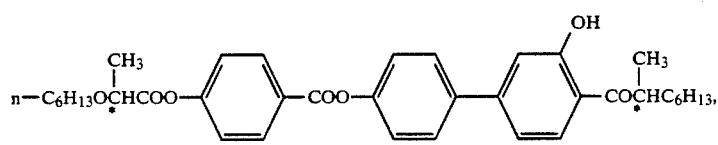
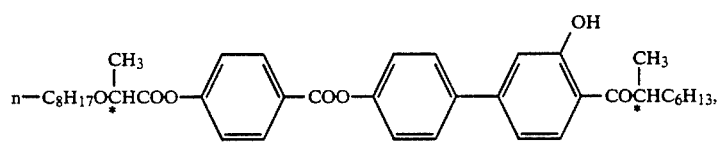
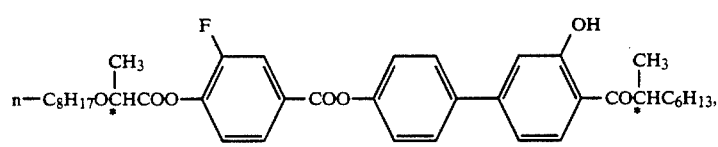
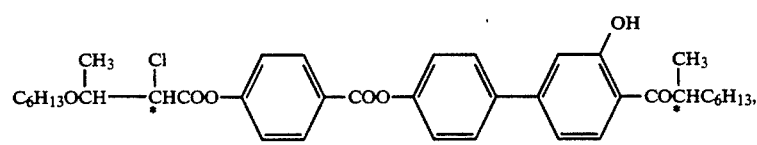
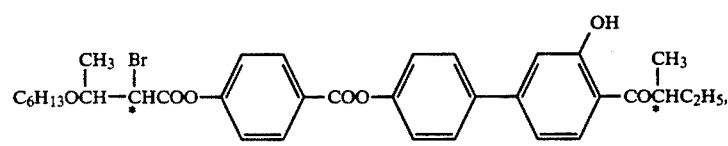
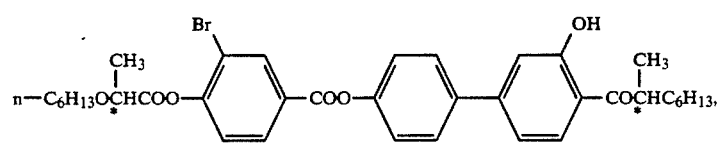

-continued
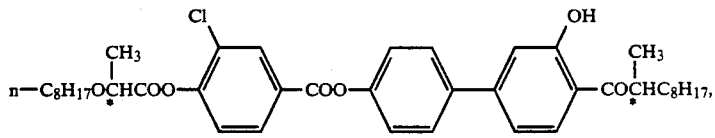
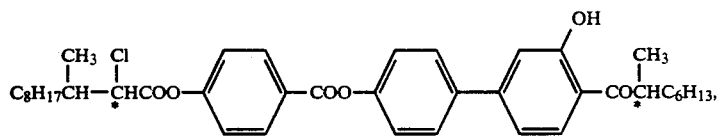
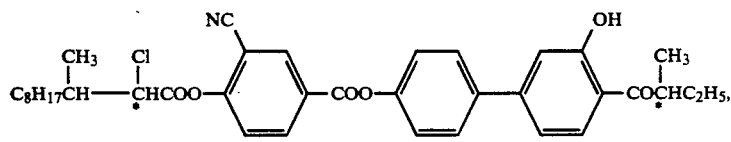
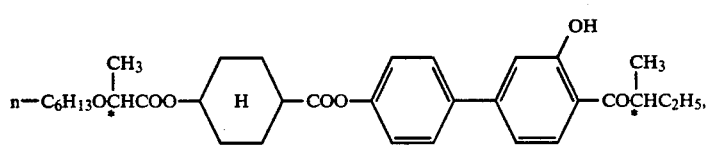
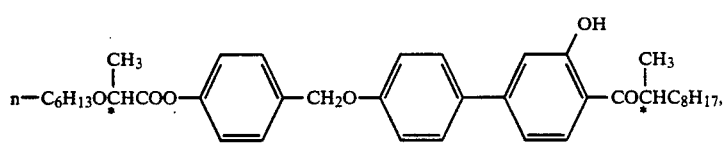
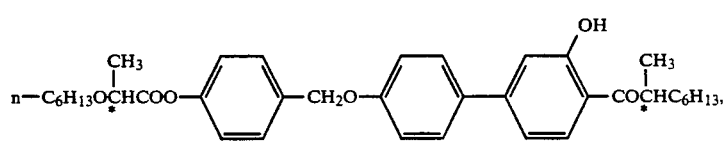
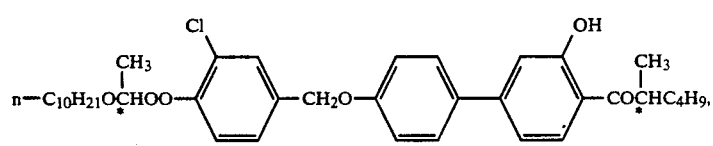
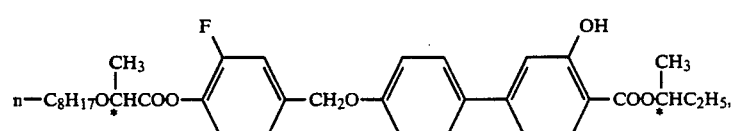
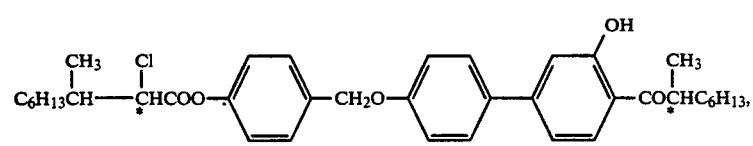
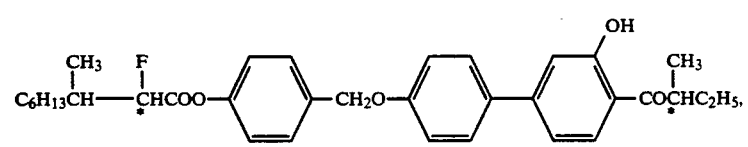
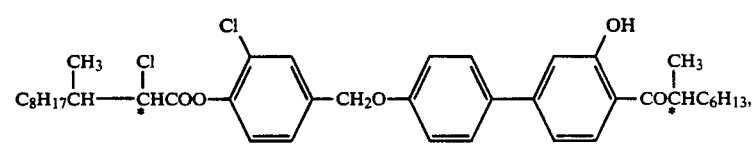

-continued

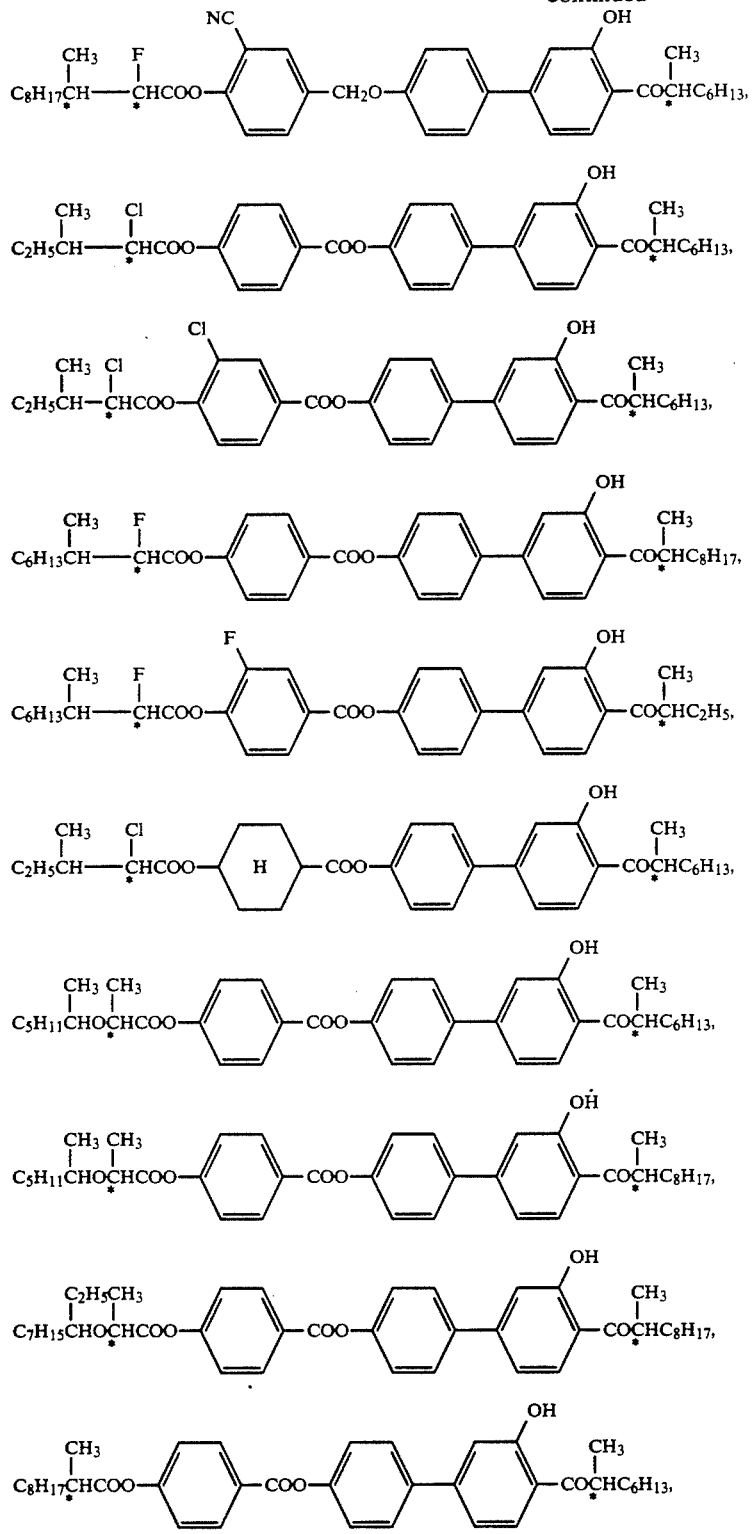

In the present invention, the other component of the chiral liquid crystal compositions containing the optically active compounds represented by the formula (I) may be a ferroelectric liquid crystal compound or a non-chiral liquid crystal compound.

PROCESS FOR THE PREPARATION OF COMPOUNDS

The optically active compounds represented by the formula (I) can be prepared by reacting 4,3'-dihydroxy-4'-acyl-1,1'-biphenyl such as represented by the formula (II) and optically active chlorides such as represented by the formula (III) in the presence of a base such as pyridine.

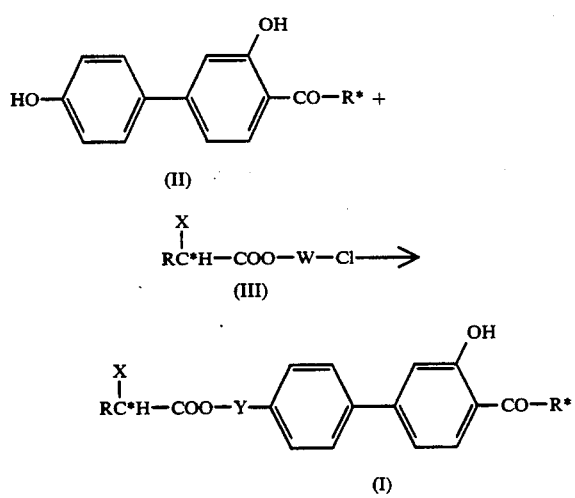

(I)

wherein R, R*, C*, X, Y and Z are as defined above, and -W- represents $$\underset{}{\text{—}}\!\!\left\langle\!\!\!\begin{array}{c}Z\\ \end{array}\!\!\!\right\rangle\!\!\text{—CO—},$$

$$\underset{}{\text{—}}\!\!\left\langle\!\!\!\begin{array}{c}Z\\ \end{array}\!\!\!\right\rangle\!\!\text{—CH}_2\!\!-\text{ or}$$

$$\underset{}{\text{—}}\!\!\left\langle\!\!\!\begin{array}{c}H\\ \end{array}\!\!\!\right\rangle\!\!\text{—CO—}.$$

However, among the compounds represented by the formula (I), those in which Y in the formula represents single bond can be obtained by reacting the compound represented by the formula (II) and a compound represented by the formula (IV):

$$\underset{X}{\text{RC*HCOCl}} \quad (IV)$$

wherein X, R and C* are as defined above, or the formula (V):

$$\underset{X}{\text{RC*HCOTs}} \quad (V)$$

wherein X, R and C* are as defined above and Ts represents p-toluenesulfonyl group.

4,3'-Dihydroxy-4'-acyl-1,1'-biphenyl represented by the formula (II) can be synthesized, for example, through the following reaction process:

I—⟨OH⟩ + ⟨⟩—CH₂Cl  →(Alkali)

—continued (diagrams showing synthesis route through compounds with OCH₂Ph, CH₃O—, I, then H₂/Pd/C or Raney Ni to (VI), then R*COCl / AlCl₃, 130° C. to (II))

The reactions for converting compound (VI) into compound (II) may take the following course:

(VI) →(R*COCl) intermediate (VII) →(AlCl₃, 130° C.) (II)

The reaction for turning compound (VII) into compound (II) may take the following course:

(VII) →(AlCl₃ / 110° C.)

CH₃O—⟨⟩—⟨OH⟩—CO—R* →(AlCl₃ / 130° C.) (II)

The present invention is illustrated by way of the following Examples.

EXAMPLE 1

Synthesis of
(s)-4-[3'-Hydroxy-4'-(2-methyl-butyroyl)-1,1'-biphenyl]
(s)-2-n-hexyloxypropionate (1) Synthesis of 3-Benzyloxyiodobenzene To a suspension of 60% sodium hydride (20 g, 0.5 mol) in dimethylformamide (300 ml), a solution of m-iodophenol (100 g, 0.454 mol) in dimethylformamide was added dropwise and then stirring was continued for 30 min at 70°±5° C. To this reaction mixture, benzyl chloride (57.4 g, 0.454 mol) was added dropwise and the reaction was continued for 2 hours at 100°±5° C. The resultant mixture was taken up in H₂O (1l) and extracted with ethyl acetate. The organic extract was washed with H₂O, dried over anhydrous MgSO₄ and then evaporated. The residual solid was recrystallized from ethanol to give the title compound as white crystals; yield: 119.7 g; mp. 51.0°-53.0° C.

¹H NMR δ ppm (CDCl₃): 5.00 (2H, s, ArCH₂O-), 6.92-7.00 (2H, m,

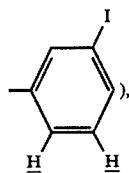

7.33-7.40 (7H, m,

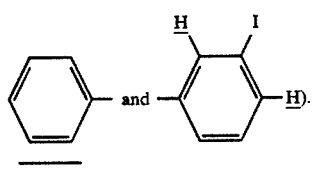

IR (KBr) ν cm⁻¹: 1240

(2) Synthesis of 3'-Benzyloxy-4-methoxy-1,1'-biphenyl

A mixture of 3-benzyloxy iodobenzene (119 g, 0.384 mol) obtained in above (1) and p-iodoanisole (89.9 g, 0.384 mol) was heated to 60°±5° C. To this mixture, copper powder (210 g) was added and then stirring was continued for 10 hours at 200°-210° C. After cooling, the reaction mixture was poured into toluene (500 ml), filtered to remove any inorganic material and evaporated. The resultant residue was chromatographed on silica gel (Wako Gel C-200, manufactured by Wako Pure Chemical Industries, Ltd.) with n-hexane/ethyl acetate (20:1) as eluent to give the title compound as white crystals; yield: 64.8 g; mp. 78.5°-81.0° C.

¹H NMR δ ppm (CDCl₃): 3.83 (3H, s, CH₃O-), 5.12 (2H, s, ArCH₂O-), 6 92 (2H, d, J=8.8Hz,

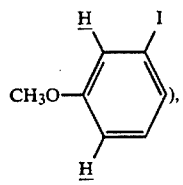

7.16-7.47 (11H, m,

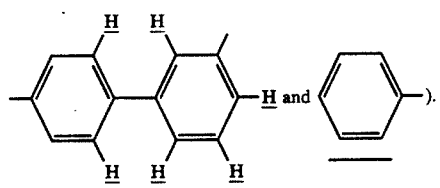

IR (KBr) ν cm⁻¹: 2850, 1240

(3) Synthesis of 3'-Hydroxy-4-methoxy-1,1'-biphenyl

3'-Benzyloxy-4-methoxy-1,1'-biphenyl (29.0 g, 0.1 mol) obtained in above (2) was reduced with hydrogen (initial hydrogen pressure: 55 kg/cm²) in the presence of Raney nickel (2 g) in the combined solvent (300 ml) of ethyl acetate and tetrahydrofuran at 100°±10° C.

After reaction, the catalyst was filtered, the solvent was evaporated and the resultant residue was chromatographed on silica gel (Wako Gel C-200) with n-hexane/ethyl acetate (10:1) as eluent to give the title compound as white crystals; yield: 15.1 g; mp. 76.5°-78.0° C.

¹H NMR δ ppm(CDCl₃): 3.82(3H, s, CH₃O—), 5.59(1H, bs, —OH), 6.77(1H, dd, J=8.8Hz,

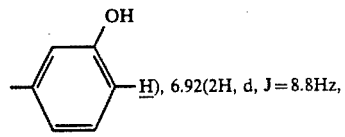), 6.92(2H, d, J=8.8Hz,

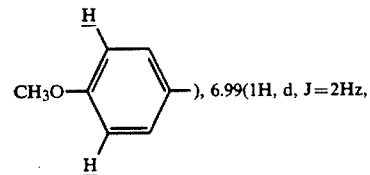), 6.99(1H, d, J=2Hz,

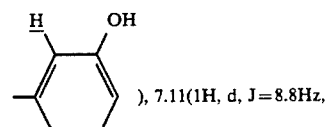), 7.11(1H, d, J=8.8Hz,

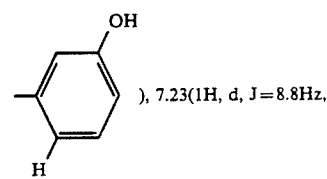), 7.23(1H, d, J=8.8Hz,

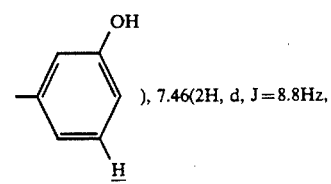), 7.46(2H, d, J=8.8Hz,

),

IR (KBr) ν cm⁻¹: 3400, 2950, 2840, 1600.

(4) Synthesis of (S)-2-Methylbutyroyl chloride

A mixture of (S)-2-methylbutyric acid (40 g, 0.39 mol) and thionyl chloride (70 g) was heated to 50° C. and stirring was continued for 2 hours at 50°-60° C. The reaction mixture was concentrated and the residue was distilled to give the title compound as a colorless oil; yield: 42 g; mp. 116°-118° C.

(5) Synthesis of (S)-3'-(2-Methylbutyroyloxy)-4-methoxy-1,1'-biphenyl

To a solution of 3'-hydroxy-4-methoxy-1,1'-biphenyl (15 g, 75 mmol) obtained in above (3) in pyridine (40 mol), (S)-2-methylbutyroyl chloride (9.1 g, 75 mmol) obtained in above (4) was added dropwise at 20°-30° C. and then stirring was continued for 2 hours at the same temperature. The reaction mixture was neutralized with dilute hydrochloric acid, extracted with ethyl acetate; the organic layer was washed with H₂O, dried over anhydrous MgSO₄ and then evaporated. The residue (pale yellow oil) was chromatographed on silica gel (Wako Gel C-200) with n-hexane/ethyl acetate (5:1) as eluent to give the title compound as a pale yellow oil; yield: 20.5 g.

$[\alpha]_D^{25} = +12.0°$ (c=2, CHCl₃).

¹H NMR δ ppm(CDCl₃): 1.03(3H, t, J=7Hz,

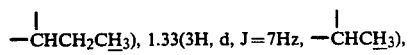
—CHCH₂CH₃), 1.33(3H, d, J=7Hz, —CHCH₃),

1.55-1.97(2H, m, —CHCH₂CH₃), 2.58-2.73(1H,

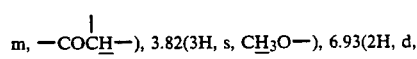
m, —COCH—), 3.82(3H, s, CH₃O—), 6.93(2H, d,

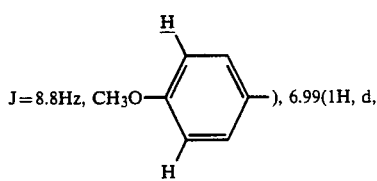
J=8.8Hz, CH₃O—⟨ ⟩—), 6.99(1H, d,

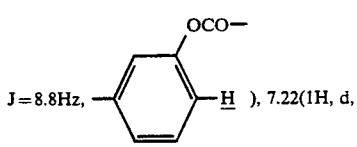
J=8.8Hz, —⟨ ⟩—H ), 7.22(1H, d,

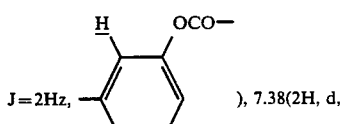
J=2Hz, —⟨ ⟩— ), 7.38(2H, d,

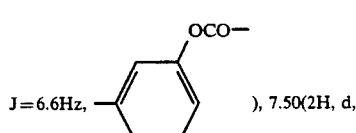
J=6.6Hz, —⟨ ⟩— ), 7.50(2H, d,

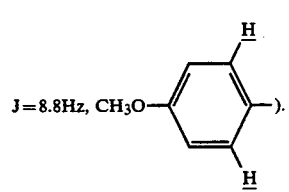
J=8.8Hz, CH₃O—⟨ ⟩—).

IR (Neat) ν cm⁻¹: 2930, 1745, 1605.

(6) Synthesis of (S)-3'-Hydroxy-4'-(2-methylbutyroyl)-4-methoxy-1,1'-biphenyl

To a suspension of aluminum chloride (5.7 g) in nitrobenzene (15 ml), (S)-3'-(2-methylbutyroyloxy)-4-methoxy-1,1'-biphenyl (10 g, 35 mmol) obtained in above (5) was added dropwise at 70° C. and then stirring was continued for 3 hours at 115°-125° C. After cooling, the reaction mixture was poured into dilute hydrochloric acid, extracted with ethyl acetate; the organic layer was washed with H₂O and dried over anhydrous MgSO₄. The solvent was removed and the resultant residue was chromatographed on silica gel (Wako Gel C-200) with n-hexane/ethyl acetate (10:1) as eluent to give the title compound as a pale yellow viscous oil; yield: 3.7 g.

$[\alpha]_D^{25} = +19.5°$ (c=2, CHCl₃).

¹H NMR δ ppm(CDCl₃): 0.96(3H, t, J=7Hz,

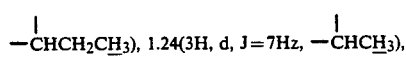
—CHCH₂CH₃), 1.24(3H, d, J=7Hz, —CHCH₃),

1.50-1.93(2H, m, —CHCH₂CH₃), 3.42-3.52(1H,

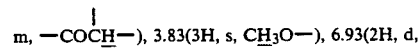
m, —COCH—), 3.83(3H, s, CH₃O—), 6.93(2H, d,

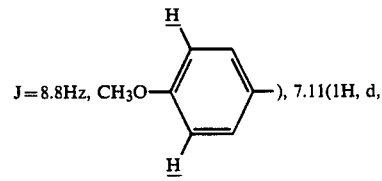
J=8.8Hz, CH₃O—⟨ ⟩—), 7.11(1H, d,

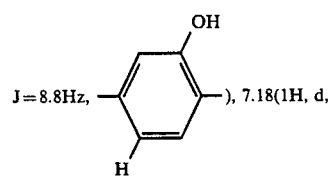
J=8.8Hz, —⟨ ⟩—), 7.18(1H, d,

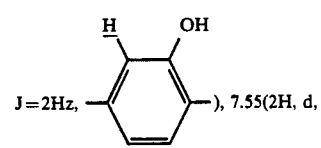
J=2Hz, —⟨ ⟩—), 7.55(2H, d,

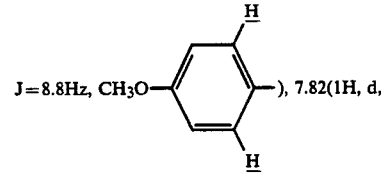
J=8.8Hz, CH₃O—⟨ ⟩—), 7.82(1H, d,

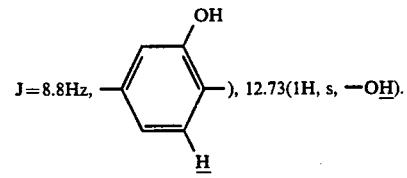
J=8.8Hz, —⟨ ⟩—), 12.73(1H, s, —OH).

IR (Neat) ν cm⁻¹: 3400, 2920, 1605.

Anal. calcd. for C₁₈H₂₀O₂: C%, 76.03; H%, 7.09. Found : C%, 75.85; H%, 7.13.

(7) Synthesis of (S)-4,3'-Dihydroxy-4'-(2-methyl-butyroyl)-1,1'-biphenyl (S)-3'-Hydroxy-4'-(2-methylbutyroyl)-4-methoxy-1,1'-biphenyl (2.8 g, 10 mmol) obtained in above (6) and aluminum chloride (1.7 g) in toluene (300 ml) were stirred for 3 hours under reflux. After cooling, the reaction mixture was poured into dilute hydrochloric acid, extracted with ethyl acetate; the organic layer was washed with H₂O and dried over anhydrous Na₂SO₄. The solvent was removed under reduced pressure and the residue was chromatographed on silica gel (Wako Gel C-200) with n-hexane/acetone (10:1) as eluent to give the title compound as a pale yellow viscous oil; yield: 17 g.

$[\alpha]_D^{25} = +18.5°$ (c=2, CHCl₃).

¹H NMR δ ppm(CDCl₃): 0.96(3H, t, J=7Hz,

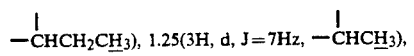
—CHCH₂CH₃), 1.25(3H, d, J=7Hz, —CHCH₃),

1.50–1.93(2H, m, —CHCH₂CH₃), 3.41–3.50(1H,

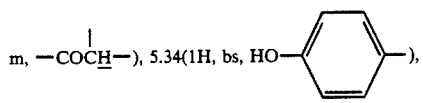
m, —COCH—), 5.34(1H, bs, HO—⟨⟩—),

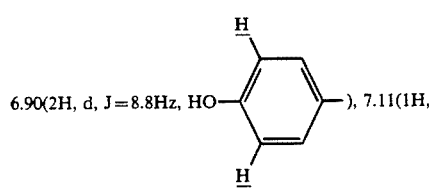
6.90(2H, d, J=8.8Hz, HO—⟨⟩—), 7.11(1H,

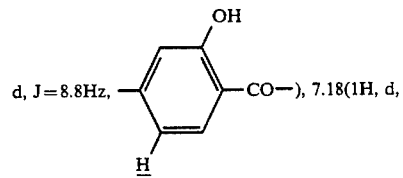
d, J=8.8Hz, —⟨⟩—CO—), 7.18(1H, d,

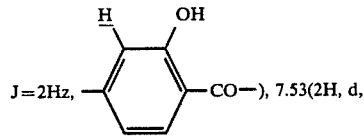
J=2Hz, —⟨⟩—CO—), 7.53(2H, d,

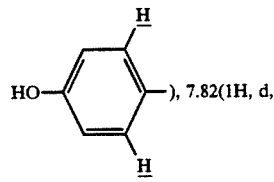
HO—⟨⟩—), 7.82(1H, d,

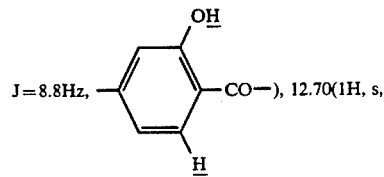
J=8.8Hz, —⟨⟩—CO—), 12.70(1H, s,

IR (Neat) ν cm⁻¹: 3350, 2960, 1610.

Anal. calcd. for C₁₈H₂₀O₂: C%, 75.53; H%, 6.71.
Found : C%, 75.50; H%, 6.81.

(8) Synthesis of (S)-4-[3'-Hydroxy-4'-(2-methyl-butyroyl)-1,1'-biphenyl] (S)-2-n-hextyloxypropionate To a solution of (S)-4,3'-dihydroxy-4'-(2-methyl-butyroyl)-1,1'-biphenyl (0.35 g, 1.3 mmol) obtained in above (7) in dry pyridine (10 ml), a solution of (s)-2-n-hexyloxypropanoyl chloride (0.25 g, 1.3 mmol) in carbon tetrachloride (20 ml) was added dropwise and then stirring was continued for 8 hours under reflux. After cooling, the reaction mixture was poured into dilute hydrochloric acid (200 ml), extracted with chloroform; the organic layer was washed each twice with dilute hydrochloric acid, aqueous sodium bicarbonate and H₂O and then dried over anhydrous Na₂SO₄. The solvent was evaporated and the residue (0.45 g) was chromatographed twice on silica gel (Wako Gel C-200) with chloroform and then n-hexane/ ethyl acetate (9:1) as eluent to afford the title compound as a pale yellow viscous oil; yield: 140 mg.

$[\alpha]_D^{20} = -27.0°$ (c=1.0, CHCl₃).

¹H NMR δ ppm(CDCl₃): 0.86–0.96(6H, m, CH₃(CH₂)₄— and —COCHCH₂CH₃), 1.24–1.88(16H, m,

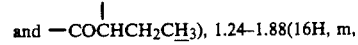
CH₃(CH₂)₄CH₂OCH— and —COCHCH₂CH₃), 3.45–3.72(3H, m, CH₃(CH₂)₄CH₂OCH— and —COCHCH₂CH₃), 4.17–4.22(1H, m, CH₃(CH₂)₄CH₂OCH—), 7.11(1H, d, J=8.8Hz, ⟨⟩—), 7.19–7.26(3H, m,

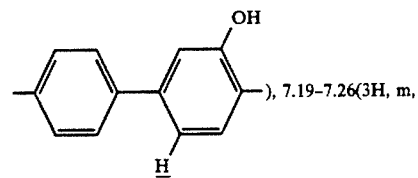
), 7.64(2H, d, J=8.8Hz,

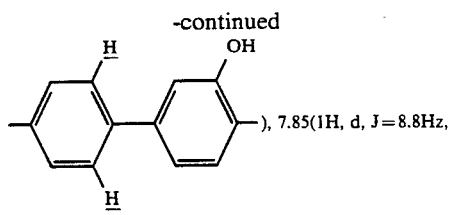), 7.85(1H, d, J=8.8Hz,

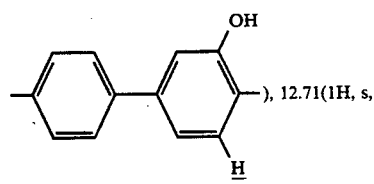), 12.71(1H, s,

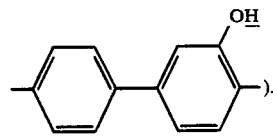).

IR (Neat) ν cm$^{-1}$: 1772, 1636, 1120, 802.
Anal. calcd. for $C_{26}H_{34}O_5$: C%, 73.19; H%, 8.03. Found : C%, 73.03; H%, 8.21

EXAMPLE 2

Synthesis of (S)-4-[3'-Hydroxy-4'-(2-methyl-butyroyl)-1,1'-biphenyl] (R)-2-n-hexyloxypropionate Using (S)-4,3'-dihydroxy-4-(2-methylbutyroyl)-1,1'-biphenyl (0.35 g, 1.3 mmol) obtained in Example 1, (7), and (R)-2-n-hexyloxypropanoyl chloride (0.25 g, 1.3 mmol), the reaction was carried out in the same manner as described in Example 1, (8), to give the title compound as a pale yellow viscous oil; yield: 160 mg.

[α]$_D^{25}$= +57.5° (c=0.4, CHCl$_3$).

$^1$H NMR δ ppm(CDCl$_3$): 0.86–0.97(6H, m, C$\underline{H}_3$(CH$_2$)$_4$— and —COCHCH$_2$C$\underline{H}_3$), 1.24–1.88(16H, m,

CH$_3$(CH$_2$)$_4$CH$_2$OC$\underline{H}$— and —COC$\underline{H}$CH$_2$CH$_3$),

| CH$_3$ |  | CH$_3$ |

3.45–3.72(3H, m, CH$_3$(CH$_2$)$_4$C$\underline{H}_2$OCH— and

—COC$\underline{H}$CH$_2$CH$_3$), 4.17–4.25(1H, m,

CH$_3$(CH$_2$)$_4$CH$_2$OC$\underline{H}$—), 7.11(1H, d, J=8.8Hz,

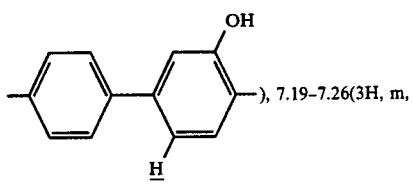), 7.19–7.26(3H, m,

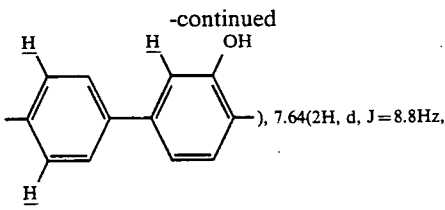), 7.64(2H, d, J=8.8Hz,

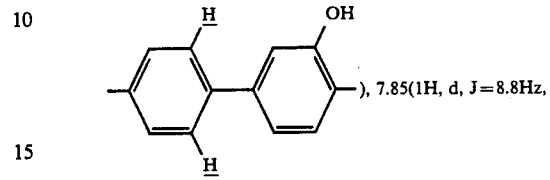), 7.85(1H, d, J=8.8Hz,

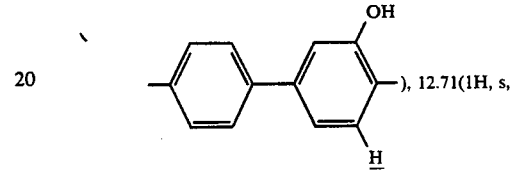), 12.71(1H, s,

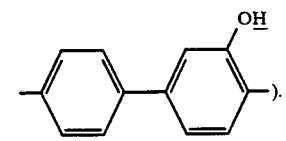).

IR (Neat) ν cm$^{-1}$: 1770, 1640, 1120.
Anal. calcd. for $C_{26}H_{34}O_5$: C%, 73.19; H%, 8.03. Found : C%, 73.11; H%, 8.22

EXAMPLE 3

Synthesis of (S)-4-[3'-Hydroxy-4'-(2-methyl-butyroyl)-1,1'-biphenyl] (S)-2-chloro-3-methylpentanoate To a solution of (S)-4,3'-dihydroxy-4'-(2-methyl-butyroyl)-1,1'-biphenyl (0.4 g, 1.5 mmol) in dry pyridine (10 ml), a solution of (S)-2-chloro-3-methylpentanoyl chloride (0.22 g, 1.3 mmol) in carbon tetrachloride (20 ml) was added dropwise and the reaction mixture was refluxed for 16 hours. After cooling to room temperature, the resultant mixture was subjected to the same procedure as described in Example 1, (8) to afford 350 mg of the title compound as a pale yellow viscous oil.

[α]$_D^{20}$= +13.4° (c=1.0, CHCl$_3$).

$^1$H NMR δ ppm(CDCl$_3$): 0.93–1.02(6H, m,

CH$_3$ Cl            CH$_3$
|   |               |
CH$_3$CH$_2$CH—C$\underline{H}$— and —COCHCH$_2$C$\underline{H}_3$), 1.15(3H, d, CH$_3$ Cl
|   |
J=6.6Hz, CH$_3$CH$_2$C$\underline{H}$—CH—), 1.25(3H, d, J=6.6Hz, CH$_3$
|
—COC$\underline{H}$C$_2$H$_5$), 1.32–1.98(4H, m, CH$_3$C$\underline{H}_2$CH—C$\underline{H}$—

CH$_3$
|
and —COCHC$\underline{H}_2$CH$_3$), 2.16–2.31(1H, m,

CH$_3$ Cl                        CH$_3$
|   |                           |
CH$_3$CH$_2$C$\underline{H}$—CH—), 3.42–3.52(1H, m, —COC$\underline{H}$C$_2$H$_5$), -continued 4.40(1H, d, J=7.0Hz, CH₃CH₂CH—CH—),
$$\overset{CH_3}{|} \overset{Cl}{|}$$

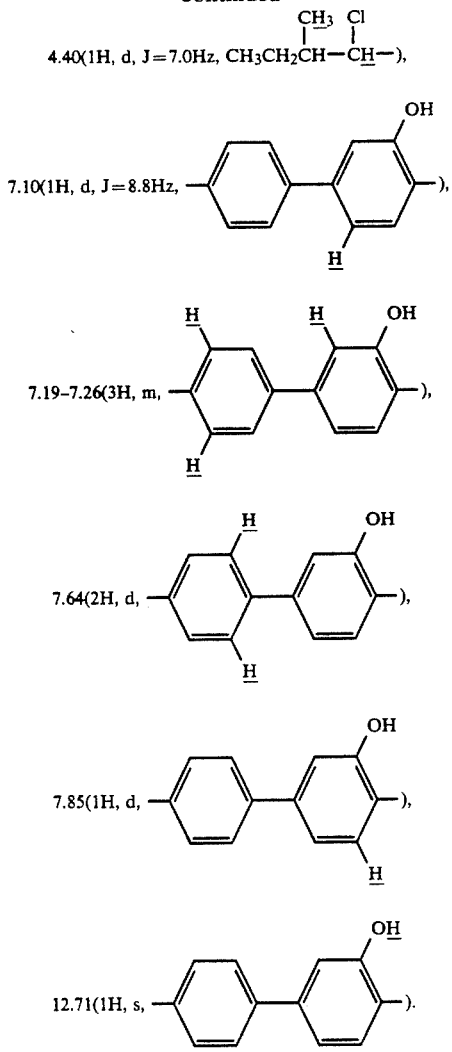

7.10(1H, d, J=8.8Hz, —[Ar-OH]—), 7.19–7.26(3H, m, —[Ar-OH]—), 7.64(2H, d, —[Ar-OH]—), 7.85(1H, d, —[Ar-OH]—), 12.71(1H, s, —[Ar-OH]—).

IR (Neat) ν cm⁻¹: 1770, 1636, 1204

EXAMPLE 4

Synthesis of
(S)-4-[3'-Hydroxy-4'-(2-methyl-butyroyl)-1,1'-biphenyl]
(R)-4-(2-n-hexyloxy-propanoyloxy)benzoate (1) Synthesis of
(R)-4-(2-n-Hexyloxypropanoyloxy)benzoic acid To a solution of p-hydroxybenzoic acid (2.15 g, 15.6 mmol) in methylene chloride (30 ml) and pyridine (10 ml), a solution of (R)-2-n-hexyloxypropanoyl chloride (3.0 g, 15.6 mmol) in methylene chloride (20 ml) was added dropwise and then the mixture was refluxed for 7 hours. After cooling, the resultant mixture was taken up in dilute hydrochloric acid, extracted with ethyl ether; the organic extract was washed twice with dilute hydrochloric acid and with H₂O for four times, and dried over anhydrous Na₂SO₄. The solvent was evaporated and the residue was recrystallized from n-hexane to afford 2.13 g of the title compound as white crystals; mp. 67.0°–72.0° C.

[α]$_D^{25}$ = +45.2° (c=2.1, CHCl₃).

IR (KBr) ν cm⁻¹: 1775, 1685, 1210, 1170, 1123.

(2) Synthesis of
(S)-4-[3'-Hydroxy-4'-(2-methyl-butyroyl)-1,1'-biphenyl]
(R)-4-(2-n-hexyloxy-propanoyloxy)benzoate To a solution of (R)-4-(2-n-hexyloxypropanoyloxy)-benzoic acid (0.5 g, 1.7 mmol) obtained in above (1) and (S)-4,3'-dihydroxy-4'-(2-methylbutyroyl)-1,1'-biphenyl (0.46 g, 1.7 mmol) obtained in Example 1, (7), in dry methylene chloride (30 ml), dimethylaminopyridine (0.02 g) and dicyclohexyl carbodiimide (0,37 g) were added, and then reaction was continued for 20 hours at room temperature with stirring. After filtration to remove any insoluble material, the filtrate was diluted with ethyl ether (50 ml); the organic layer was washed twice with dilute hydrochloric acid and thrice with H₂O, dried over anhydrous Na₂SO₄ and then evaporated. The resultant residue (0.86 g) was chromatographed twice on silica gel (Wako Gel C-200, manufactured by Wako Pure Chemical Industries, Ltd.) with n-hexane/ethyl acetate (9:1) and then chloroform as eluent and was recrystallized from a mixed solvent of ethyl acetate/n-hexane (1:9) to give 300 mg of the title compound as white microneedles. mp. 50.0°–53.0° C.

[α]$_D^{25}$ = +41.9° (c=0.82, CHCl₃).

¹H NMR δ ppm(CDCl₃): 0.87–0.99(6H, m,

CH₃(CH₂)₄CH₂O— and —COCHCH₂CH₃),
$$\overset{CH_3}{|}$$

1.26–1.92(16H, m, CH₃(CH₂)₄CH₂OCH— and
$$\overset{CH_3}{|}$$

—COCHCH₂CH₃), 3.43–3.74(3H, m,
$$\overset{CH_3}{|}$$

CH₃(CH₂)₄CH₂OCH— and —COCHCH₂CH₃),
$$\overset{CH_3}{|} \quad \overset{CH_3}{|}$$

4.18–4.26(1H, m, CH₃(CH₂)₄CH₂OCH—), 7.13–7.36
$$\overset{CH_3}{|}$$

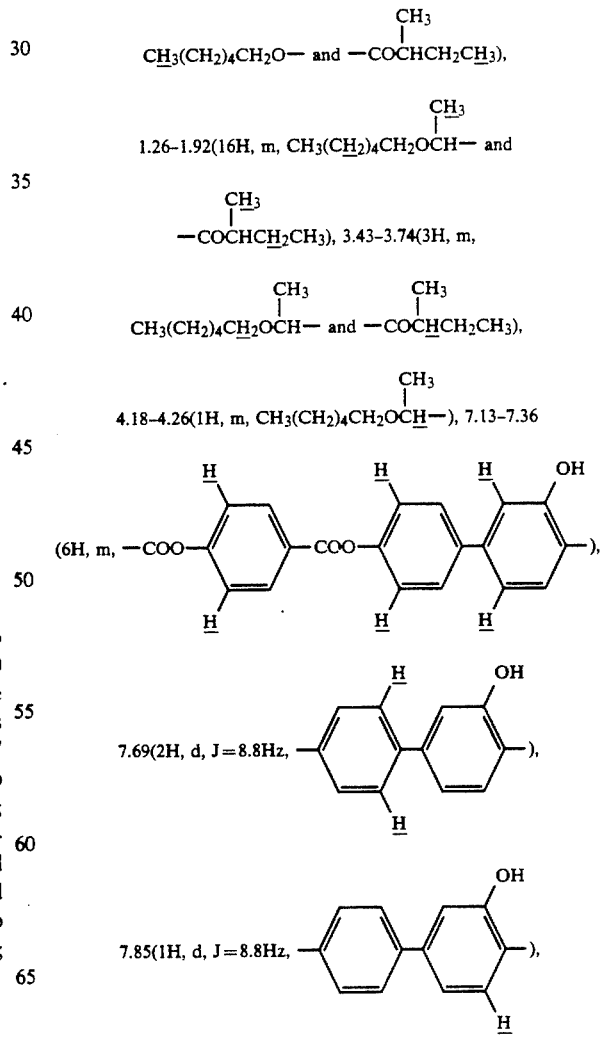

(6H, m, —COO—[Ar]—COO—[Ar-OH]—), 7.69(2H, d, J=8.8Hz, —[Ar-OH]—), 7.85(1H, d, J=8.8Hz, —[Ar-OH]—), 8.27(2H, d, J=8.8Hz, 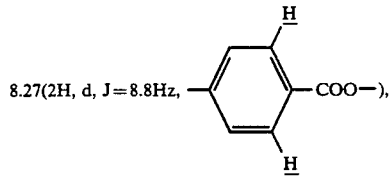—COO—), 12.71(1H, s, 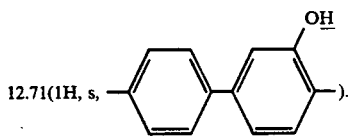).

IR (KBr) ν cm⁻¹: 1772, 1738, 1636, 1604, 1264, 1204, 1162, 1120, 1072, 798

Anal. calcd. for $C_{33}H_{38}O_7$: C%, 72.51; H%, 7.01. Found : C%, 72.39; H%, 7.19

EXAMPLE 5

Synthesis of (S)-4-[3'-Hydroxy-4'-(2-methyl-octanoyl)-1,1'-biphenyl] (R)-4-(2-hexyloxy-propanoyloxy)benzoate

(1) Synthesis of (S)-3'-(2-Methyloctanoyloxy)-4-methoxy-1,1'-biphenyl

Using 3'-hydroxy-4-methoxy-1,1'-biphenyl (4.2 g, 20.4 mmol) obtained in Example 1, (3) and (S)-2-methyloctanoylchloride (4.1 g, 21.5 mmol), the reaction was carried out in the same manner as described in Example 1, (5), to give the title compound as a pale yellow oil; yield: 5.4 g.

$[\alpha]_D^{25} = +16.1°$ (c=2, $CH_2Cl_2$).

IR (Neat) ν cm⁻¹: 3070, 2950, 2880, 1760, 1615

(2) Synthesis of (S)-3'-Hydroxy-4-(2-methyloctanoyl)-4-methoxy-1,1'-biphenyl Using (S)-3'-(2-methyloctanoyloxy)-4-methoxy-1,1'-biphenyl (5.4 g, 15.8 mmol) obtained in above (1), the reaction was carried out in the same manner as described in Example 1, (6), to give the title compound as a pale yellow viscous oil; yield: 2.4 g.

$[\alpha]_D^{25} = +19.1°$ (c=0.23, $CH_2Cl_2$).

IR (Neat) ν cm⁻¹: 3400, 2920, 1605.

(3) Synthesis of (S)-4,3'-Dihydroxy-4'-(2-methyl-octanoyl)-1,1'-biphenyl

Using (S)-3'-hydroxy-4'-(2-methyloctanoyl)-4-methoxy-1,1'-biphenyl (2.3 g, 6.8 mmol) obtained in above (2), the reaction was carried out in the same manner as described in Example 1, (7), to give 1.3 g of the title compound as a pale yellow viscous oil.

$[\alpha]_D^{25} = +18.9°$ (c=0.26, $CH_2Cl_2$).

¹H NMR δ ppm(CDCl₃): 0.87(3H, t, J=6.6Hz,

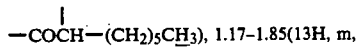—COCH—(CH₂)₅CH₃), 1.17-1.85(13H, m,

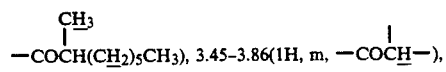—COCH(CH₂)₅CH₃), 3.45-3.86(1H, m, —COCH—), 5.30(1H, bs, HO—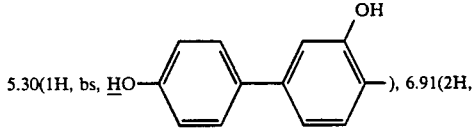), 6.91(2H, d, J=8.8Hz, HO—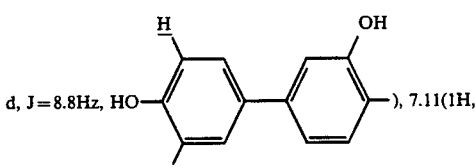), 7.11(1H, d, J=8.8Hz, 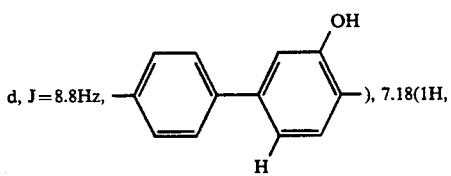), 7.18(1H, d, J=2.1Hz, 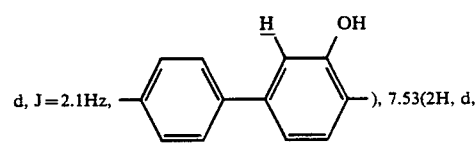), 7.53(2H, d,

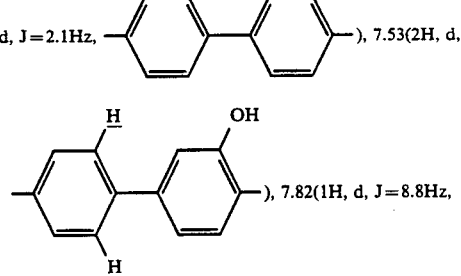), 7.82(1H, d, J=8.8Hz,

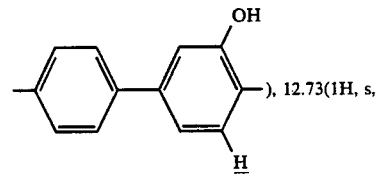), 12.73(1H, s,

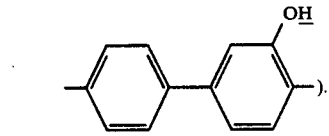).

IR (Neat) ν cm⁻¹: 3400, 2940, 2860, 1610.

Anal. calcd for $C_{21}H_{26}O_3$: C%, 77.27; H%, 8.03. Found C%, 77.09; H%, 8.11

(4) Synthesis of (S)-4-[3'-hydroxy-4'-(2-methyl-octanoyl)-1,1'-biphenyl] (R)-4-(2-n-hexy(oxypropanoyloxy)benzoate (R)-4-(2-n-hexyloxypropanoyloxy)benzoic acid (0.63 g, 2.1 mmol) obtained in Example 4, (1), and thionyl chloride (0.75 g) in dry methylene chloride (10 ml) was refluxed for 3 hours with stirring. After cooling to room temperature, the reaction mixture was added dropwise to a solution of (S)-4,3'-dihydroxy-4'-2-methyloctanoyl)-1,1'-biphenyl (0.7 g, 2.1 mmol) obtained in above (4) in pyridine (10 ml) and methylene chloride (10 ml), and then stirring was continued for 3 hours at room temperature. The resultant mixture was taken up in dilute hydrochloric acid (150 ml), extracted with methylene chloride (2×100 ml) and the organic extract was subjected to the same procedure as described in Example 1, (8), to give the title compound as white crystals; yield: 610 mg; mp. 68.0°–71.0° C.

[α]$_D^{25}$= +34.2° (c=0.5, CHCl$_3$).

$^1$H NMR δ ppm(CDCl$_3$): 0.85–0.92(6H, m,

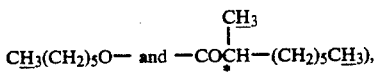

1.24–1.85(24H, m, CH$_3$(CH$_2$)$_4$CH$_2$OCH— and

3.47–3.74(3H, m,

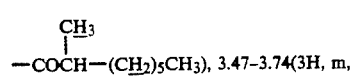

CH$_3$(CH$_2$)$_4$CH$_2$O— and —COCH—), 4.18–4.26

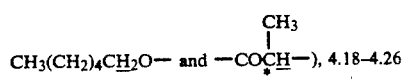

(1H, m, —CH$_2$OCHCOO—), 7.14–7.33(6H, m,

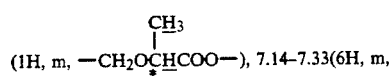

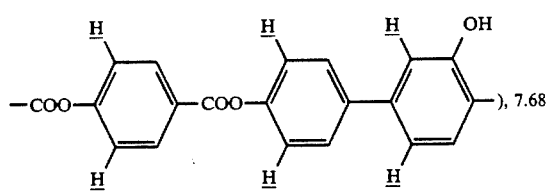
), 7.68

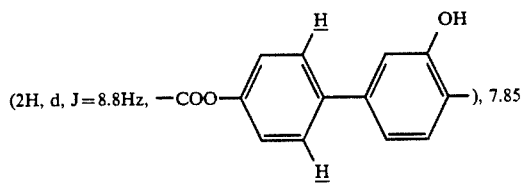
), 7.85

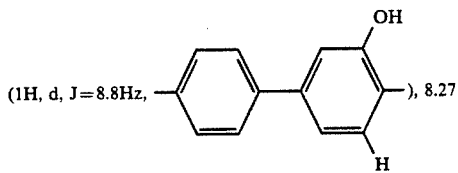
), 8.27

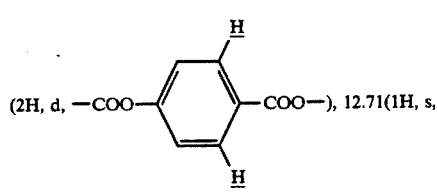
), 12.71(1H, s,

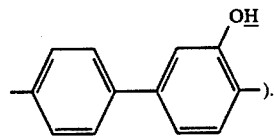
).

IR (KBr) ν cm$^{-1}$: 2930, 2850, 1775, 1735, 1630, 1605.
Anal. calcd. for C$_{37}$H$_{46}$O$_7$: C%, 73.73; H%, 7.69.
Found: C%, 73.70; H%, 7.73.

EXAMPLE 6

Synthesis of (S)-4-[3'-Hydroxy-4'-(2-methyl-octanoyl)-1,1'-biphenyl] (S)-4-(2-methyldecanoyloxy)benzoate (1) Synthesis of (S)-4-(2-Methyldecanoyloxy)benzoic acid Using p-hydroxybenzoic acid (3.25 g, 23.5 mmol) and (S)-2-methyldecanoylchloride (4.83 g, 23.6 mmol), the reaction was carried out in the same manner as described in Example 4, (1), to give 2.35 g of the title compound as white crystals; mp. 92.5°–96.5° C.

[α]$_D^{25}$= +21.9° (c=0.37, CH$_2$Cl$_2$).

IR (KBr) ν cm$^{-1}$: 2930, 2855, 1750, 1680, 1605.

(2) Synthesis of (S)-4-[3'-Hydroxy-4'-(2-methyl-octanoyl)-1,1'-biphenyl] (S)-4-(2-methyldecanoyl-oxy)benzoate Using (S)-4-(2-methyldecanoyloxy)benzoic acid (470 mg, 1.5 mmol) obtained in above (1) and (S)-4,3'-dihydroxy-4'-(2-melhyloctanoyl)-1,1'-biphenyl (500 mg, 1.5 mmol) obtained in Example 5, (3), the reaction was carried out in the same manner as described in Example 4, (2). The resultant crude product was chromatographed on silica gel (Wako Gel C-200) with n-hexane/ethyl acetate (30:1) as eluent to give the title compound as white crystals; yield: 500 mg; mp. 39.5°–42.5° C.

[α]$_D^{25}$= +17.7° (c=0.49, CHCl$_3$).

$^1$H NMR δ ppm(CDCl$_3$): 0.85–0.93(6H, m,

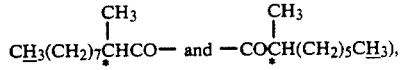

1.24–1.85(30H, m, CH$_3$(CH$_2$)$_7$CHCO— and

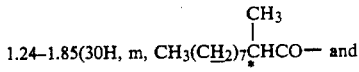

2.66–2.75(1H, m,

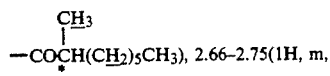
), 3.47–3.58(1H, m,

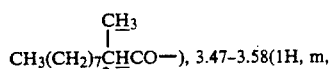

7.13–7.33(6H, m,

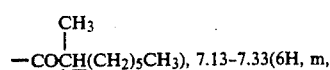

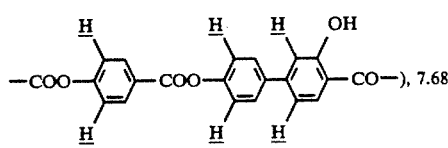
), 7.68

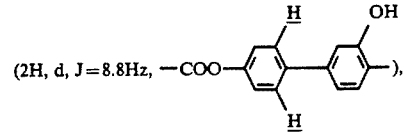

7.86(1H, d, J=8.8Hz, 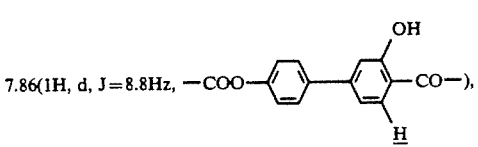
),

-continued 8.25(2H, d, J=8.8Hz, 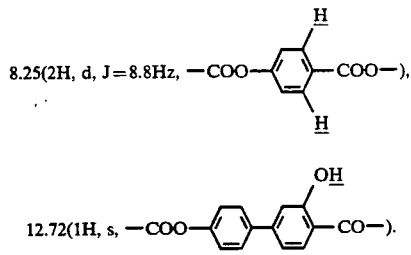

12.72(1H, s, —COO—⟨⟩—⟨OH⟩—CO—).

IR (KBr) ν cm⁻¹: 2930, 2860, 1760, 1730, 1635, 1605.
Anal. calcd. for $C_{39}H_{50}O_6$: C%, 76.19; H%, 8.20.
Found: C%, 76.10; H%, 8.22.

EXAMPLE 7

Synthesis of
(S)-4-[3'-Hydroxy-4'-(2-methyl-octanoyl)-1,1'-biphenyl]
(S)-4-(2-chloro-3-methylpentanoyloxy)benzoate (1) Synthesis of
(S)-4-(2-Chloro-3-methylpentanoyloxy)benzoic acid Using p-hydroxybenzoic acid (1.93 g, 14.0 mmol) and (S)-2-chloro-3-methylpentanoylchloride (2.28 g, 13.5 mmol), the reaction was carried out in the same manner as described in Example 4, (1), to give the title compound as white crystals; yield: 2.95 g; mp. 97.0°–100.5° C.

$[\alpha]_D^{25}$ = +4.8° (c=0.83, $CH_2Cl_2$).
IR (KBr) ν cm⁻¹: 2930, 2870, 1770, 1680, 1608.

(2) Synthesis of
(S)-4-[3'-Hydroxy-4'-(2-methyl-octanoyl)-1,1'-biphenyl]
(S)-4-(2-chloro-3-methylpentanoyloxy)benzoate Using (S)-4-(2-chloro-3-methylpentanoyloxy)benzoic acid (410 mg, 1.5 mmol) obtained in about (1) and (S)-4,3'-dihydroxy-4'-(2-methyloctanoyl)-1,1'-biphenyl (500 mg, 1.5 mmol) obtained in Example 5, (3), the reaction was carried out in the same manner as described in Example 4, (2). The resultant crude product was chromatographed on silica gel (Wako Gel C-200) with n-hexane/ethyl acetate (10:1) as eluent to give the title compound as white crystals; yield: 550 mg; mp. 57.5°–59.5° C.

$[\alpha]_D^{25}$ = +9.3° (c=0.47, CHCl₃).

¹H NMR δ ppm(CDCl₃): 0.85(3H, t, J=6.7Hz,

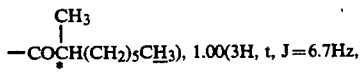
—COCH(CH₂)₅CH₃), 1.00(3H, t, J=6.7Hz,

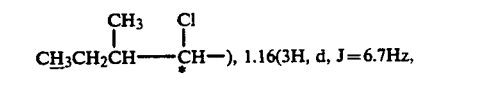
CH₃CH₂CH—CH—), 1.16(3H, d, J=6.7Hz,

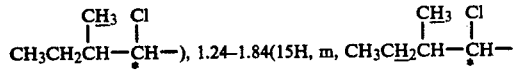
CH₃CH₂CH—CH—), 1.24–1.84(15H, m, CH₃CH₂CH—CH—

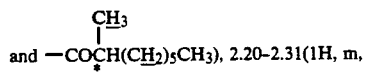
and —COCH(CH₂)₅CH₃), 2.20–2.31(1H, m,

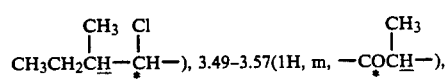
CH₃CH₂CH—CH—), 3.49–3.57(1H, m, —COCH—),

-continued 4.41(1H, d, J=7.0Hz, CH₃CH₂CH—CH—), 7.13–7.33

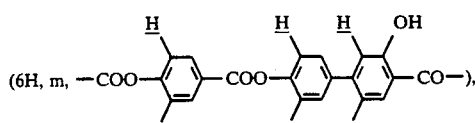
(6H, m, —COO—⟨⟩—COO—⟨⟩—CO—),

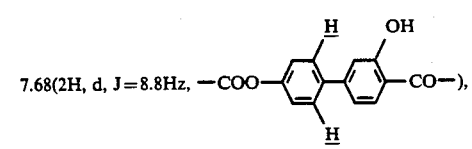
7.68(2H, d, J=8.8Hz, —COO—⟨⟩—CO—),

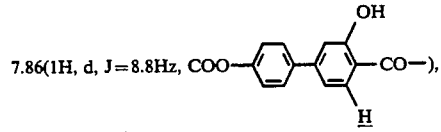
7.86(1H, d, J=8.8Hz, COO—⟨⟩—CO—),

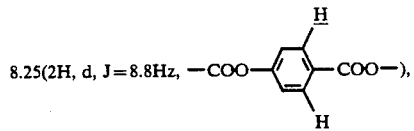
8.25(2H, d, J=8.8Hz, —COO—⟨⟩—COO—),

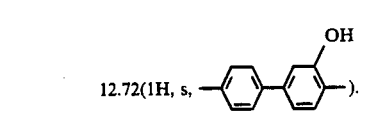
12.72(1H, s, —⟨⟩—⟨OH⟩—).

IR (KBr) ν cm⁻¹: 2930, 2860, 1770, 1740, 1640, 1600.
Anal. calcd. for $C_{34}H_{39}ClO_6$: C%, 70.51; H%, 6.79.
Found: C%, 70.39; H%, 6.93.

EXAMPLE 8

Synthesis of
(S)-4-[3'-Hydroxy-4'-(2-methyl-octanoyl)-1,1'-biphenyl]
(R)-3-chloro-4-(2-nhexyloxypropanoyloxy)benzoate (1) Synthesis of
(R)-3-chloro-4-(2-n-hexyloxypropanoyloxy)benzoic acid Using 3-chloro-4-hydroxybenzoic acid ½ hydrate (3.76 g, 20.7 mmol) and (R)-2-n-hexyloxypropanoyl chloride (3.98 g, 20.7 mmol), the reaction was carried out in the same manner as described in Example 4, (1), to give the title compound as a pale yellow oil; yield: 2.60 g.

$[\alpha]_D^{25}$ = +47.8° (c=2.0, $CH_2Cl_2$).
IR (Neat) ν cm⁻¹: 2930, 2860, 1775, 1700, 1600

(2) Synthesis of
(S)-4-[3'-Hydroxy-4'-(2-methyl-propanoyloxy)benzoate

Using (R)-3-chloro-4-(2-n-hexyloxypropanoyloxy)-benzoic acid (500 mg, 1.5 mmol) obtained in above (1) and (S)-4,3'-dihydroxy-4'-(2-methyloctanoyl)-1,1'-biphenyl (500 mg, 1.5 mmol) obtained in Example 5, (3), the reaction was carried out in the same manner as described in Example 4, (2). The resultant crude product was chromatographed on silica gel (Wako Gel C-200) with n-hexane/ethyl acetate (50:1→25:1) as eluent, and then recrystallized from ethanol to give the title compound as white needles; yield: 580 mg; mp. 77.5°–78.5° C.

$[\alpha]_D^{25}$ = +34.2° (c=0.63, CHCl₃).

$^1$H NMR δ ppm(CDCl$_3$): 0.86–0.91(6H, m,

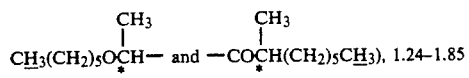), 1.24–1.85

(24H, m, 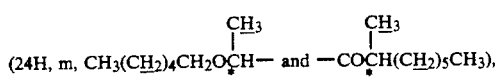), 3.47–3.77(3H, m, CH$_3$(CH$_2$)$_4$CH$_2$O— and

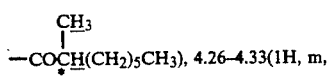), 4.26–4.33(1H, m,

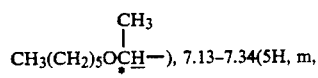), 7.13–7.34(5H, m,

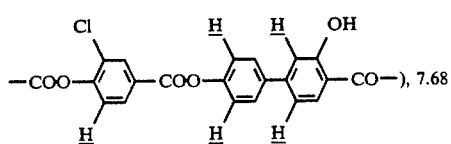), 7.68

(2H, d, J=8.8Hz, 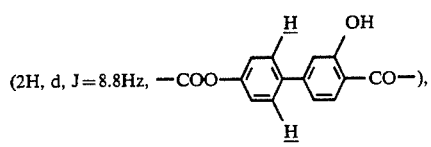), 7.86(1H, d, J=8.8Hz, 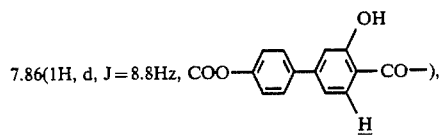), 8.17(1H, d, J=8.8Hz, 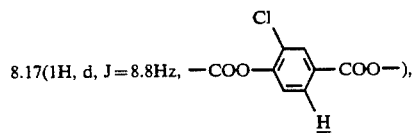), 8.33(1H, d, J=1.6Hz, 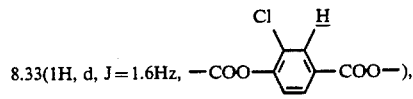), 12.71(1H, s, 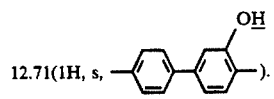).

IR (KBr) ν cm$^{-1}$: 2940, 2860, 1780, 1738, 1640, 1600.
Anal. calcd. for C$_{37}$H$_{45}$ClO$_7$: C%, 69.74; H%, 7.12.
Found : C%, 69.66; H%, 7.19.

EXAMPLE 9
Synthesis of
(S)-4-[3'-Hydroxy-4'-(2-methyl-octanoyl)-1,1'-biphenyl]
(R)-trans-4-(2-nhexyloxypropanoyloxy)cyclohexane
carboxylate (1) Synthesis of
(R)-trans-4-(2-n-hexyloxypropanoyloxy)cyclohexane
carboxylic acid Using trans-4-hydroxycyclohexane carboxylic acid (1.01 g, 7 mmol) and (R)-2-n-hexyloxypropanoyl chloride (1.35 g, 7 mmol), the reaction was carried out in the same manner as described in Example 4, (1), to give the title compound as a pale yellow oil; yield: 750 mg.
[α]$_D^{25}$=+37.4° (c=1.0, CHCl$_3$).

$^1$H NMR δ ppm(CDCl$_3$): 0.86(3H, t, J=6.6Hz, CH$_3$(CH$_2$)$_5$O—)1.24–1.86(15H, m,

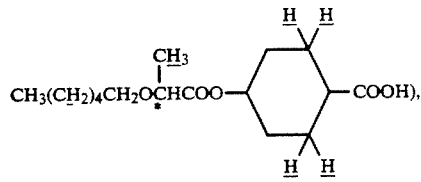, 1.98–2.38(5H, m, 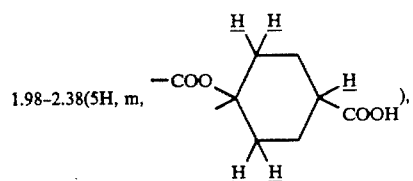, 3.36–3.62(2H, m, 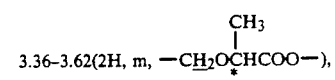, 4.03(1H, m, 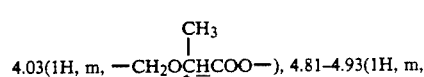), 4.81–4.93(1H, m,

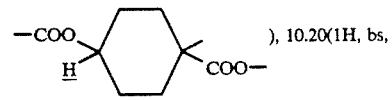), 10.20(1H, bs,

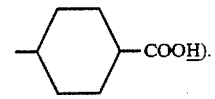).

IR (Neat) ν cm$^{-1}$: 2960, 2920, 2840, 1710, 1605.

(2) Synthesis of
(S)-4-[3'-Hydroxy-4'-(2-methyl-octanoyl)-1,1'-biphenyl]
(R)-trans-4-(2-n-hexyloxypropanoyloxy)cyclohexane
carboxylate Using (R)-trans-4-(2-n-hexyloxypropanoyloxy)cyclohexane carboxylic acid (450 mg, 1.5 mmol) obtained in above (1) and (S)-4,3'-dihydroxy-4'-(2-methyloctanoyl)-1,1'-biphenyl (500 mg, 1.5 mmol) obtained in Example 5, (3), the reaction was carried out in the same manner as described in Example 4, (2). The resultant crude product was purified by column chromatography on silica gel (Wako Gel C-200) with n-hexane/ ethyl acetate (20:1) as eluent to give the title compound as white crystals; yield: 120 mg; mp. 60.0°–63.0° C.
[α]$_D^{25}$=+26.4° (c=0.8, CHCl$_3$).

$^1$H NMR δ ppm(CDCl$_3$): 0.85–0.92(6H, m,

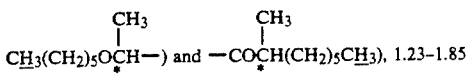, 1.23–1.85

-continued (28H, m, CH₃(CH₂)₄CH₂OCHCOO— and 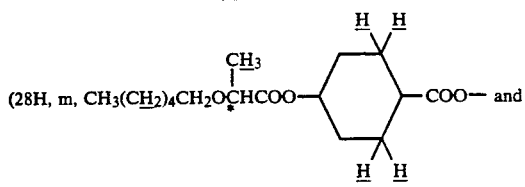

—COCH(CH₂)₅CH₃), 2.15-2.26(4H, m,

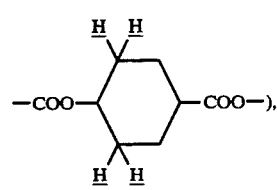

2.59(1H, t, 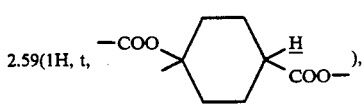

3.30-3.60(3H, m, CH₃(CH₂)₄CH₂OCHCOO— and

—COCH(CH₂)₅CH₃), 3.90-3.97(1H, m,

—CH₂OCHCOO—), 4.81-4.93(1H, m,

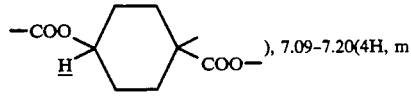), 7.09-7.20(4H, m

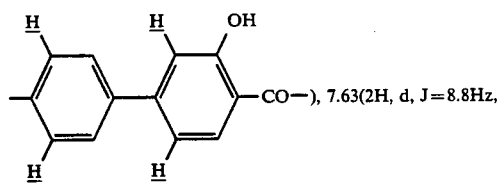), 7.63(2H, d, J=8.8Hz,

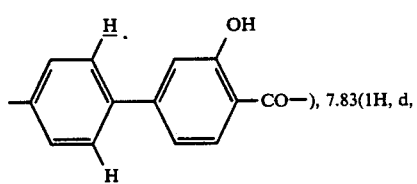, 7.83(1H, d,

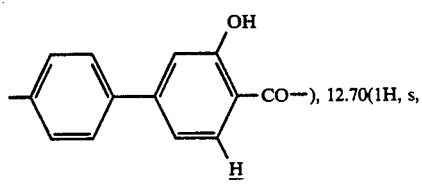, 12.70(1H, s,

-continued

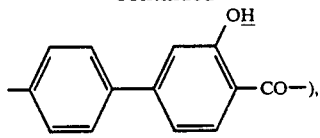

IR (KBr) ν cm⁻¹: 2940, 2860, 1750, 1740, 1630.
Anal. calcd. for C₃₇H₅₂O₇: C%, 73.00; H%, 8.61.
Found : C%, 73.09; H%, 8.68.

Comparative Example 1

Synthesis of (S)-4-[4'-(2-Methylbutyroyl)-1,1'biphenyl] (R)-4-(2-n-hexyloxypropanoyloxy)benzoate (1) Synthesis of 4-Methoxy-1,1'-biphenyl To a solution of 4-hydroxy-1,1'-biphenyl (34 g, 0.2 mol) and potassium hydroxide (20 g, 0.36 mol) in methanol (400 ml) and H20 (200 ml), methyl iodide (28.4 g, 0.2 mol) was added, and the resultant mixture was stirred for 4 hours under reflux. After cooling, the mixture was poured into H₂O (1 l), the resultant precipitate was filtered, washed with H20 and recrystallized from ethanol to give the title compound as white crystals; yield;: 26.5 g; mp. 87.3°-87.7° C.

¹H NMR δ ppm(CDCl₃): 3.82(3H, s, CH₃O—), 6.96

(2H, d, J=8.8Hz, CH₃O— 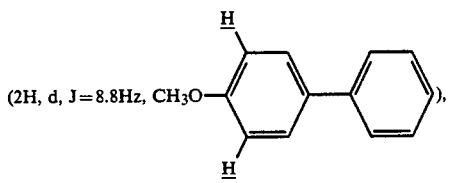), 7.31-7.56(7H, m, CH₃O— 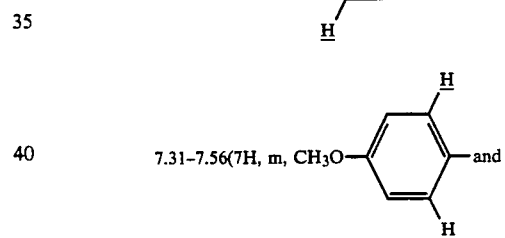 and

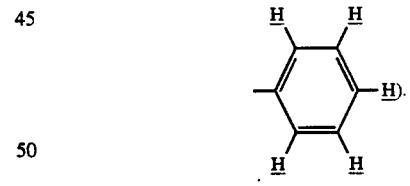.

IR (KBr) ν cm⁻¹: 2950, 2840, 1600.

(2) Synthesis of (S)-4-Methoxy-4'-(2-methylbutyroyl)-1,1'-biphenyl

To a suspension of aluminum chloride (13.0 g) in dry methylene chloride, 4-methoxy-1,1'-biphenyl (9.16 g, 49.8 mmol) obtained in above (1) was added in a small portion at 0° C. or lower, and then a solution of (S)-2-methylbutyroyl chloride (6.0 g, 49.8 mmol) in methylene chloride was added dropwise over 1 hour. The resultant mixture was stirred for 3 hours at room temperature, poured into ice-cold H₂O (500 ml), diluted with methylene chloride (100 ml) and the organic layer was separated. The organic layer was washed with aqueous sodium bicarbonate, and then H₂O, dried over anhydrous Na₂SO₄ and the solvent was evaporated.

The resultant residue (7.6 g) was recrystallized twice from combined solvents of n-hexane/ethyl acetate (4:1) to give 2.56 g of the title compound as white crystals. mp. 119.0°–120.0° C.

[α]$_D^{25}$ = +23.1° (c=2, CHCl$_3$).

$^1$H NMR δ ppm(CDCl$_3$): 0.94(3H, t, J=6.6Hz,

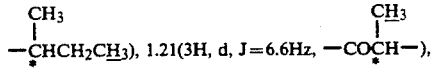 1.21(3H, d, J=6.6Hz, —COCH—),

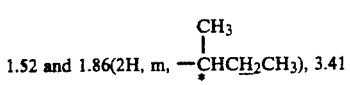 3.41

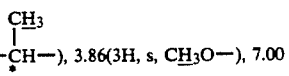 3.86(3H, s, CH$_3$O—), 7.00

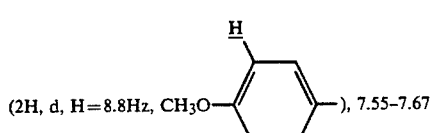 7.55–7.67

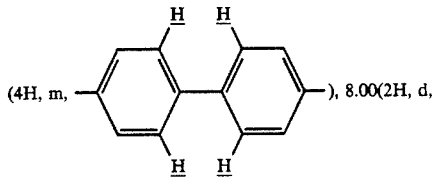 8.00(2H, d, J=8.8Hz,

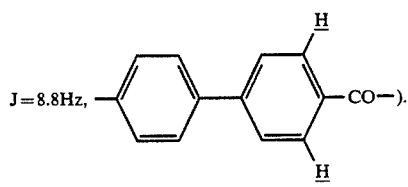

IR (KBr) ν cm$^{-1}$: 2940, 1680, 1600.

(3) Synthesis of (S)-4-Hydroxy-4'-(2-methylbutyroyl)-1,1'-biphenyl

To a solution of (S)-4-methoxy-4'-(2-methylbutyroyl)-1,1'-biphenyl (2.56 g, 9.5 mmol) obtained in above (2) in toluene (30 ml), aluminum chloride (2.0 g) was added in a small portion, the stirring was continued for 3 hours under reflux. After cooling to room temperature, the mixture was taken up in dilute hydrochloric acid (300 ml), extracted with chloroform (2×100 ml), the organic extract was washed with H$_2$O, dried over anhydrous Na$_2$SO$_4$ and evaporated. The residue (1.8 g) was purified by column chromatography on silica gel (Wako Gel C-200, manufactured by Wako Pure Chemical Industries, Ltd.) with chloroform as eluent to give 1.28 g of the title compound as white crystals. mp. 95.5°–98.5° C.

[α]$_D^{25}$ = +20.7° (c=2, CHCl$_3$).

$^1$H NMR δ ppm(CDCl$_3$): 0.94(3H, t, J=6.6Hz,

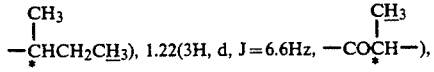 1.22(3H, d, J=6.6Hz, —COCH—), 1.52 and 1.85(2H, m, 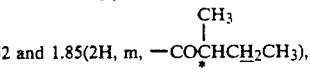

3.43(1H, m, 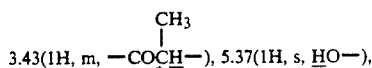), 5.37(1H, s, HO—), 6.94(2H, d, J=8.8Hz, 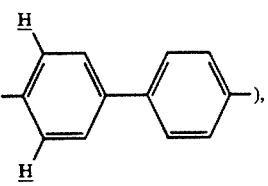

7.53(2H, d, J=8.8Hz, 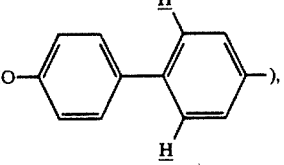

7.63(2H, d, 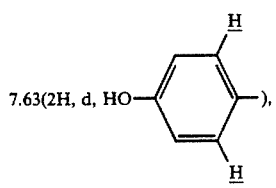

8.01(2H, d, 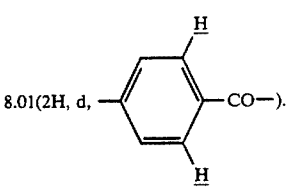

IR (KBr) ν cm$^{-1}$: 3364, 2965, 2945, 2875, 1658, 1600.

(4) Synthesis of (S)-4-[4'-(2-Methylbutyroyl)-1,1'biphenyl] (R)-4-(2-n-hexyloxypropanoyloxy)benzoate Using (S)-4-hydroxy-4'-(2-methylbutyroyl)-1,1'-biphenyl (0.38 g, 1.5 mmol) obtained in above (3) and (R)-4-(2-n-hexyloxypropanoyloxy)benzoate (0.43 g, 1.5 mmol) obtained in Example 4, (1), the reaction was carried out in the same manner as described in Example 4, (2), and then chromatographed on silica gel (Wako Gel C-200) with n-hexane/ethyl acetate (9:1) as eluent to give the title compound as white crystals; yield: 350 mg. mp. 86.0°–88.0° C.

IR (KBr) ν cm$^{-1}$: 2956, 1766, 1740, 1678.

Comparative Example 2

Synthesis of (S)-4-[4'-(2-Methyloctanoyl)-1,1'biphenyl] (R)-4-(2-hexyloxypropanoyloxy)benzoate

(1) Synthesis of (S)-4-Methoxy-4'-(2-methyloctanoyl)-1,1'-biphenyl

Using 4-methoxy-1,1'-biphenyl (4.6 g, 25 mmol) obtained in Comparative Example 1, (1), and (S)-2-methyloctanoylchloride (4.8 g, 27.2 mmol), the reaction was carried out in the same manner as described in Comparative Example 1, (2), and the residual oil was purified by column chromatography on silica gel (Wako Gel C-200) with n-hexane/ethyl acetate (10:1) as eluent to give 1.9 g of the title compound as a yellow oil.

[α]$_D^{25}$ = +10.6° (c=0.2, CHCl$_3$).

IR (Neat) ν cm$^{-1}$: 2940, 1670, 1605.

(2) Synthesis of (S)-4-Hydroxy-4-(2-methyloctanoyl)-1,1'-biphenyl

Using (S)-4-methoxy-4'-(2-methyloctanoyl)-1,1'-biphenyl obtained in above (1), the reaction was carried out in the same manner as described in Comparative Example 1, (3), and the residual oil (1.8 g) was chromatographed on silica gel (Wako Gel C-200) with n-hexane/methylene chloride (2:1) as eluent to give 0.8 g of the title compound as a pale yellow oil.

[α]$_D^{25}$ = +12.8° (c=0.2, CHCl$_3$).

$^1$H NMR δ ppm(CDCl$_3$): 0.92(3H, t, J=6.6Hz,

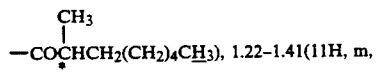, 1.22–1.41(11H, m,

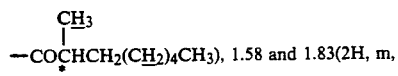, 1.58 and 1.83(2H, m,

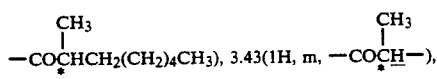, 3.43(1H, m, —COC$\underline{H}$—), 5.40(1H, bs, $\underline{H}$O—), 6.94(2H, d, J=8.8Hz,

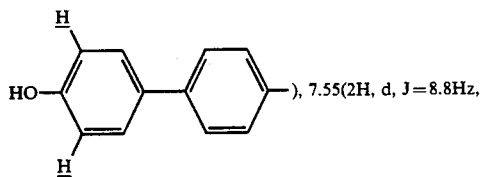), 7.55(2H, d, J=8.8Hz,

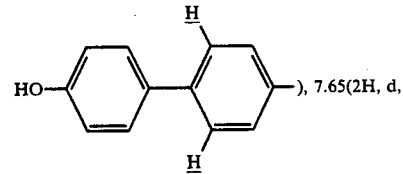), 7.65(2H, d,

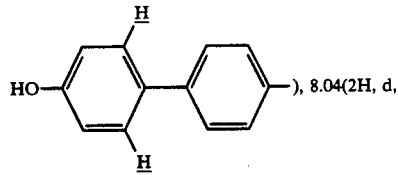), 8.04(2H, d,

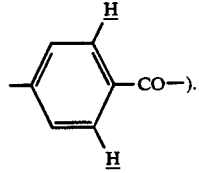).

IR (Neat) ν cm$^{-1}$: 3365, 2965, 2945, 2875, 1658, 1600.

(3) Synthesis of (S)-4-[4'-(2-Methyloctanoyl)-1,1'-biphenyl] (R)-4-(2-n-hexyloxypropanoyloxy)benzoate Using (S)-4-hydroxy-4'-(2-methyloctanoyl)-1,1'-biphenyl (0.53 g, 1.7 mmol) obtained in above (2) and (R)-4-(2-n-hexyloxypropanoyloxy)benzoate (0.55 g, 1.8 mmol) obtained in Example 4, (1), the reaction was carried out in the same manner as described in Example 4, (2), and the residue was chromatographed on silica gel (Wako Gel C-200) with n-hexane/ethyl acetate (9:1) as eluent to afford the title compound as white crystals; yield: 200 mg. mp. 68.0°–71.0° C.

[α]$_D^{25}$ = +45.6° (c=0.42, CHCl$_3$).

$^1$H NMR δ ppm(CDCl$_3$): 0.84–0.92(6H, m,

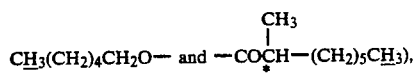, 1.21–1.41(17H, m, CH$_3$(C$\underline{H}_2$)$_3$CH$_2$CH$_2$O— and

, 1.58–1.83(7H, m,

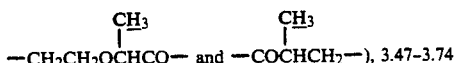 and 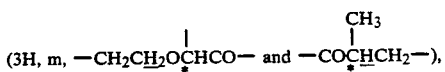), 3.47–3.74

(3H, m, 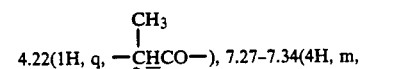), 4.22(1H, q, ), 7.27–7.34(4H, m,

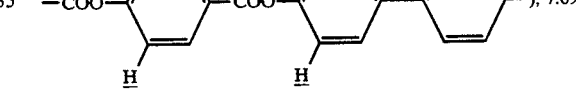), 7.69

(4H, d, J=8.8Hz, 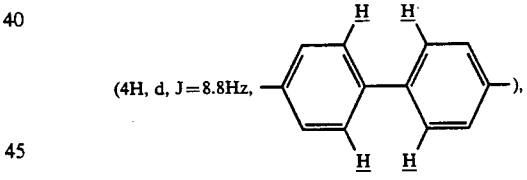), 8.04(2H, d, J=8.8Hz, 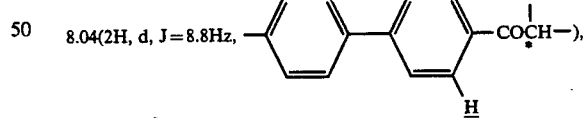, 8.27(2H, D, J=8.8Hz, 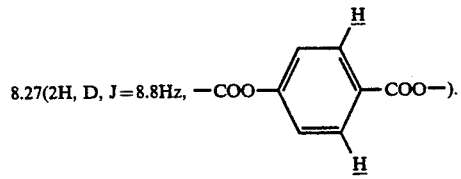).

IR (KBr) ν cm$^{-1}$: 2940, 2870, 1770, 1740, 1680, 1605.

Table 1 shows the molecular structure, phase transition temperature and spontaneous polarization at a temperature 2° C. below Sc* phase upper limit temperature of the compounds obtained in Examples 1–9. Determination of liquid crystal phase and that of phase transition temperature were made by measurement with a differential scanning calorimeter and by observation under a polarization microscope equipped with a temperature controller. Spontaneous polarization was determined by the triangular wave method.

Table 2 shows the molecular structure, phase transition temperature and spontaneous polarization at a temperature 2° C. below Sc* phase upper limit temperature of the compounds (Comparative Examples) analogous to the compounds of this invention but having no hydroxyl group at the core. A comparison of spontaneous polarization with that in Table 1 evidently shows the prominent effect of the presence of hydroxyl group at the core.

EXAMPLES 10-17

The compounds of Examples 2-9 were added severally, each in an amount of 10%, to a smectic C liquid crystal composition ZLI3234B (mfd. by Merck Inc.), and phase transition temperature was measured. Each of the liquid crystal compositions thus obtained was encapsulated in a testing liquid crystal cell (made by forming a polyimide film on an ITO coated glass plate, rubbing the film in a predetermined direction, and laminating two substrates by using 2 μm-diameter glass beads as spacer) to prepare a test sample. When each of the thus prepared testing samples was observed under a polarization microscope by applying a voltage of ±10 V at 25° C., there was noted a change in strength of transmitted light. Response time was determined from such change in strength of transmitted light. Spontaneous polarization was determined by the triangular wave method at 25° C. The test results are shown in Table 3.

For the sake of comparison, the results of determinations made on the samples prepared similarly to Examples 10-17 by using the compounds of Comparative Examples 1 and 2 are shown in Table 4. A comparison of Table 3 and Table 4 shows that the effect of introduction of hydroxyl group in the present invention is reflected in the liquid crystal compositions, too.

TABLE 1

| Example | In formula (I) R | X | Configuration of C*X | Y | R* | Phase transition temperature Cr Sc* I (°C.) | Spontaneous polarization (nc/cm$^2$) |
|---|---|---|---|---|---|---|---|
| 1 | n-C$_6$H$_{13}$O— | CH$_3$ | (S) | Direct link | (S)—C$_2$H$_5$CH(CH$_3$)— | (Liquid) | — |
| 2 | n-C$_6$H$_{13}$O— | CH$_3$ | (R) | Direct link | (S)—C$_2$H$_5$CH(CH$_3$)— | (Liquid) | — |
| 3 | C$_2$H$_5$CH(CH$_3$)— | Cl | (S) | Direct link | (S)—C$_2$H$_5$CH(CH$_3$)— | (Liquid) | — |
| 4 | n-C$_6$H$_{13}$O— | CH$_3$ | (R) | —⟨phenyl⟩—COO— | (S)—C$_2$H$_5$CH(CH$_3$)— | •54 • | — |
| 5 | n-C$_6$H$_{13}$O— | CH$_3$ | (R) | —⟨phenyl⟩—COO— | (S)-n-C$_6$H$_{13}$CH(CH$_3$)— | •63 (•12)• | 820 |
| 6 | n-C$_8$H$_{17}$— | CH$_3$ | (S) | —⟨phenyl⟩—COO— | (S)-n-C$_6$H$_{13}$CH(CH$_3$)— | •45 • | — |
| 7 | C$_2$H$_5$CH(CH$_3$)— | Cl | (S) | —⟨phenyl⟩—COO— | (S)-n-C$_6$H$_{13}$CH(CH$_3$)— | •53 • | — |
| 8 | n-C$_6$H$_{13}$O— | CH$_3$ | (R) | —⟨phenyl-Cl⟩—COO— | (S)-n-C$_6$H$_{13}$CH(CH$_3$)— | •75 • | — |
| 9 | n-C$_6$H$_{13}$O— | CH$_3$ | (R) | —⟨cyclohexyl-H⟩—COO— | (S)-n-C$_6$H$_{13}$CH(CH$_3$)— | •51 • | — |

Cr = crystal; Sc* = chiral smectic phase; I = isotropic liquid, Dot (•) indicates presence of the phase. Parenthese ( ) indicate monotropic transtion.

TABLE 2

$$RC^*H-COO-\bigcirc-COO-\bigcirc-\bigcirc-COR^*$$
$$\overset{X}{|}$$

| Comp. Example | R | X | Configuration of C*X | R* | Phase transition temperature Cr Sc* S_A I (°C.) | Spontaneous polarization (nC/cm$^2$) |
|---|---|---|---|---|---|---|
| 1 | n-C$_6$H$_{13}$O— | CH$_3$ | (R) | (S)—C$_2$H$_5$CH(CH$_3$)— | •51 (•32)• 102• | 270° |
| 2 | n-C$_6$H$_{13}$O— | CH$_3$ | (R) | (S)-n-C$_6$H$_{13}$CH(CH$_3$)— | •67 (•63)• 65• | 443 |

TABLE 3

| Example | Compound | Sc* S$_A$ N* I | Spontaneous polarization (nC/cm$^2$) | Response time (μsec) |
|---|---|---|---|---|
| 10 | Compound of Example 2 | .52 . 79. | 6.3 | 320 |
| 11 | Compound of Example 3 | .50 . 83. | 6.0 | 470 |
| 12 | Compound of Example 4 | .74 . 83 . 97. | 7.4 | 335 |
| 13 | Compound of Example 5 | .73 . 83 . 94. | 10.5 | 165 |
| 14 | Compound of Example 6 | .74 . 81 . 94. | 3.1 | 380 |
| 15 | Compound of Example 7 | .73 . 83 . 95. | 16.8 | 175 |
| 16 | Compound of Example 8 | .73 . 83 . 89. | 11.8 | 190 |
| 17 | Compound of Example 9 | .64 . 87 . 93. | 5.3 | 275 |

TABLE 4

| Comp. Example | Compound | Sc* S$_A$ N* I | Spontaneous polarization (nC/cm$^2$) | Response time (μsec) |
|---|---|---|---|---|
| 3 | Compound of Comp. Example 1 | .71 . 90 . 99. | 4.3 | 350 |
| 4 | Compound of Comp. Example 2 | .71 . 89 . 97. | 9.4 | 275 |

EXAMPLE 18

A liquid crystal composition was prepared by mixing the following compounds at the specified ratios:
2-(4-nonyloxyphenyl)-5-heptylpyrimidine : 22.2%
2-(4-hexyloxyphenyl)-5-octylpyrimidine : 22.2%
2-(4-octyloxyphenyl)-5-octyloxypyrimidine : 22.2%
4-pentyloxyphenyl 4-octyloxybenzoate : 7.1%
4-hexyloxyphenyl 4-octyloxybenzoate : 7.1%
4-hexyloxyphenyl 4-decyloxybenzoate : 7.1%
4-hexyloxyphenyl 4-pentylbenzoate : 7.1%
Compound of Example : 1 5.0%

This composition showed chiral smectic phase at temperatures ranging from below 0° C. to 39° C. and cholesteric phase at temperature from 39° to 67° C.

A test sample was prepared by using this liquid crystal composition in the same manner as described in Examples 10-17 and observed under a polarization microscope by applying a voltage of±10 V. There was noted a change in strength of transmitted light. Response time as determined from such change was 2.2 milliseconds at 25° C.

EXAMPLE 19

A composition was prepared with the same formulation as in Example 18 except for use of the compound of Example 3 in place of the compound of Example 1.

This composition showed chiral smectic phase at temperatures ranging from below −20° C. to 35° C. and cholesteric phase at temperatures from 35° to 69° C.

By using this liquid crystal composition, a test sample was prepared in the same way as Examples 10–17 and observed under a polarization microscope by applying a voltage of±10 V, which showed a change in strength of transmitted light. Response time as determined from such change was 900 microseconds at 25° C.

EXAMPLES 20 TO 24

A composition was prepared by adding a compound obtained in Examples 5 to 9 in an amount of 10 w/w% to a 1:1 mixture of 2-(4-octyloxyphenyl)-5-octylpyrimidine and -(4-hexyloxyphenyl)-5-heptyloxypyrimidine [phase transition temperatures: Cr 24 Sc 68 SA 75 N 84 I].

Phase transition temperatures, spontaneous polarization at 25° C. and response time were measured in the same manner as described in Examples 10 to 17.

The results are shown in Table 5.

TABLE 5

| Example | Compound | Phase transition temperature Sc* S$_A$ N* I | Spontaneous polarization (nC/cm$^2$) | Response time (μsec) |
|---|---|---|---|---|
| 20 | Compound of Example 5 | .64 . 71 . 76. | 17.7 | 110 |
| 21 | Compound of Example 6 | .63 . 69 . 76. | 7.6 | 160 |
| 22 | Compound of Example 7 | .65 . 71 . 77. | 17.9 | 110 |
| 23 | Compound of Example 8 | .64 . 67 . 75. | 19.3 | 120 |
| 24 | Compound of Example 9 | .58 . . 76. | 12.7 | 100 |

Note: N means a nematic phase.

As is clear from the results of Table 5, the addition of a compound of the present invention provides a liquid crystal composition having high speed responsibility.

The compounds of the present invention represented by the formula (I) are the optically active compounds having a chemically stable molecular structure. They include those showing themselves very large spontaneous polarization, and when mixed with other liquid crystal compounds, they can provide ferroelectric liquid crystal compositions which induce large spontaneous polarization and act at high speed. Also, since the compounds of this invention have plural asymmetric carbons in the molecule, there can be obtained ferroelectric liquid crystal compositions with a long helical pitch when the directions of helices generated by the center of asymmetry of the respective asymmetric carbons are different from each other.

What is claimed is:

1. An optically active compound represented by the formula:

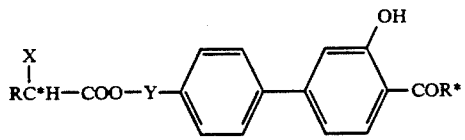

wherein R is a straight-chain or branched alkyl group having 1 to 16 carbon atoms or a straight-chain or branched alkoxy group having 1 to 16 carbon atoms; R* is an optically active alkyl group having 1 to 16 carbon atoms; X is a lower alkyl group or a halogen atom; Y is a single bond,

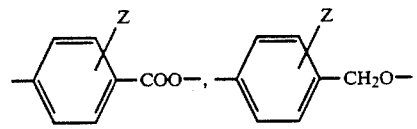

or

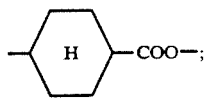

Z is a hydrogen atom, a halogen atom or a cyano group; and C* is an asymmetric carbon, provided that R and X cannot be the same alkyl group.

2. An optically active compound according to claim 1, wherein Y in the formula (I) is a single bond or

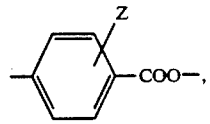

wherein Z is a hydrogen atom, a halogen atom or a cyano group.

3. An optically active compound according to claim 1, wherein Y in the formula (I) is

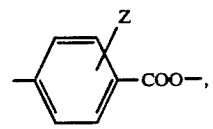

wherein Z is a hydrogen atom a halogen atom or a cyano group.

4. A chiral liquid crystal composition comprising an optically active compound represented by the formula:

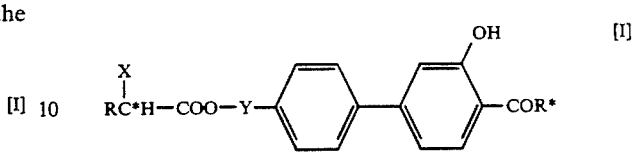

wherein R is a straight-chain or branched alkyl group having 1 to 16 carbon atoms or a straight-chain or branched alkoxy group having 1 to 16 carbon atoms; R* is an optically active alkyl group having 1 to 16 carbon atoms; X is a lower alkyl group or a halogen atom; Y is a single bond,

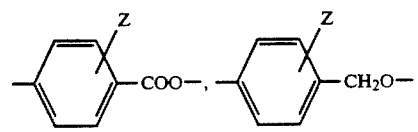

or

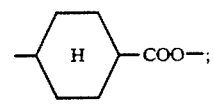

Z is a hydrogen atom, a halogen atom or a cyano group; and C* is an asymmetric carbon atom, provided that R and X cannot be the same alkyl group.

5. A chiral liquid crystal composition according to claim 4, wherein Y in the formula (I) is a single bond or

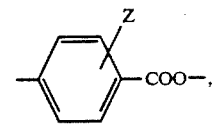

wherein Z is a hydrogen atom, a halogen atom or a cyano group.

6. A chiral liquid crystal composition according to claim 4, wherein Y in the formula (I) is

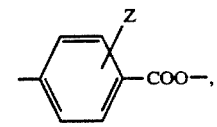

wherein Z is a hydrogen atom, a halogen atom or a cyano group.

* * * * *